United States Patent
Chung et al.

(10) Patent No.: US 10,630,167 B2
(45) Date of Patent: Apr. 21, 2020

(54) ADAPTIVE LOADING TECHNIQUES TO AVOID NEGATIVE VOLTAGE SLOPE AND OUTPUT OVERSHOOT DURING SYSTEM START-UP

(71) Applicant: Infineon Technologies Austria AG, Villach (AT)

(72) Inventors: Po-Jung Chung, New Taipei (TW); Pierrick Ausseresse, Munich (DE); Josef Fisch, Erdweg (DE); Tung Yi Yang, New Taipei (TW)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/889,988

(22) Filed: Feb. 6, 2018

(65) Prior Publication Data

US 2019/0245431 A1    Aug. 8, 2019

(51) Int. Cl.
*H02M 3/156* (2006.01)
*H02M 1/36* (2007.01)
(Continued)

(52) U.S. Cl.
CPC ............. *H02M 1/36* (2013.01); *H02M 3/156* (2013.01); *H02M 1/4233* (2013.01); *H02M 2001/007* (2013.01); *H02M 2001/0058* (2013.01)

(58) Field of Classification Search
CPC .... H02M 3/156; H02M 3/158; H02M 3/1588; H02M 3/155; H02M 3/1582;
(Continued)

(56) References Cited

U.S. PATENT DOCUMENTS

2014/0009978 A1* 1/2014 Brinlee ............... H02M 1/4225
363/25
2015/0097538 A1* 4/2015 Le ........................ H02M 3/158
323/271
(Continued)

OTHER PUBLICATIONS

"Digital Multi-Mode PFC + LLC Combo Controller," Infineon, IDP 2303 Datasheet, Rev. V2.0, Mar. 21, 2017, accessed from, https://www.infineon.com/dgdl/Infineon-IDP2303-DS-v02_00-EN.pdf?fileId=5546d4625b10283a015b195528a649ea, 38 pp.
(Continued)

*Primary Examiner* — Bryan R Perez
(74) *Attorney, Agent, or Firm* — Shumaker & Sieffert, P.A.

(57) ABSTRACT

A switched mode power supply (SMPS) to output a smoothly rising voltage ($V_{OUT}$) during startup and still operate efficiently during steady state. A smoothly rising $V_{OUT}$ that avoids a negative voltage slope and voltage overshoot may be desirable in some applications. The techniques of this disclosure include an adaptive loading time controlled oscillator (TCO) compensation circuit that adjusts the TCO frequency to linearly regulate the feedback voltage from the half-bridge ($V_{HBFB}$). The TCO compensation circuit adapts to the startup loading and self-adjusts the regulation speed for the handover point between the TCO and the voltage controlled oscillator (VCO).

20 Claims, 12 Drawing Sheets

(51) Int. Cl.
*H02M 1/42* (2007.01)
*H02M 1/00* (2006.01)

(58) Field of Classification Search
CPC ............... H02M 3/157; H02M 3/1563; H02M 2007/4818; H02M 2007/4815; H02M 2007/4811; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 2001/0058; H02M 2001/007
See application file for complete search history.

(56) References Cited

U.S. PATENT DOCUMENTS

2015/0364947 A1\* 12/2015 Murayama .............. H02J 5/005
    320/108
2017/0070144 A1\* 3/2017 Katikaneni ........... H02M 3/158

OTHER PUBLICATIONS

"TEA19161T Digital controller for high-efficiency resonant power supply," NXP Semiconductors, Product Data Sheet, Rev. 1, Mar. 10, 2016, 46 pp.
"TEA19162T PFC controller," NXP Semiconductors, Product Data Sheet, Rev. 1, Mar. 10, 2016, 30 pp.

\* cited by examiner

US 10,630,167 B2

ADAPTIVE LOADING TECHNIQUES TO AVOID NEGATIVE VOLTAGE SLOPE AND OUTPUT OVERSHOOT DURING SYSTEM START-UP

TECHNICAL FIELD

The disclosure relates to power supply units.

BACKGROUND

A power supply unit (PSU) start up sequence for a switched mode power supply (SMPS) may utilize a time controlled oscillator (TCO) during an initial start up period. As half-bridge (FIB) voltage feedback ($V_{HBFB}$) becomes available, a controller for the PSU may hand over control of the operating system frequency from the TCO to a voltage controlled oscillator (VCO). Performance factors for the PSU start up period may include an amount of time needed for the PSU to provide a steady state output voltage, an amount of voltage overshoot and negative voltage slope during start up, as well as other factors. A PSU may be configured to supply a wide power range, which may impact the performance factors.

SUMMARY

In general, the disclosure is directed to techniques that cause a switched mode power supply (SMPS) to output a smoothly rising voltage ($V_{OUT}$) during startup and still operate efficiently during steady state. A smoothly rising $V_{OUT}$ that avoids a negative voltage slope and voltage overshoot may be desirable in some applications, such as a power supply unit (PSU) for computer equipment. The techniques of this disclosure include adding an adaptive loading time controlled oscillator (TCO) compensation circuit to a controller for the SMPS. The adaptive loading TCO compensation circuit may adjust the TCO frequency based on the drop rate slope (dv/dt) of the feedback voltage from the half-bridge ($V_{HBFB}$) and the load on the SMPS. The TCO compensation circuit may adjust the TCO operating frequency to linearly regulate $V_{HBFB}$ drop rate.

In one example, the disclosure is directed to a switched mode power supply (SMPS) control circuit, the circuit comprising: a time controlled oscillator (TCO), configured to output a control signal comprising a TCO frequency, and a TCO compensation circuit including a feedback input element. The feedback input element receives a voltage feedback signal, and the TCO compensation circuit is configured to adjust the TCO frequency of the control signal such that the voltage feedback signal decreases approximately linearly.

In another example, the disclosure is directed to a system comprising; an LLC converter circuit; and an LLC control circuit, the circuit comprising: a time controlled oscillator (TCO), configured to output a control signal comprising a TCO frequency, and a TCO compensation circuit including a feedback input element, wherein the feedback input element receives a voltage feedback signal. The TCO compensation circuit is configured to adjust the TCO frequency of the control signal such that the voltage feedback signal decreases approximately linearly.

In another example, the disclosure is directed to a method comprising: receiving, by a switched mode power supply (SMPS) control circuit, a voltage feedback signal, outputting a control signal, by the SMPS control circuit, wherein the control signal is generated by a time controlled oscillator (TCO) and wherein the control signal comprises a TCO frequency, adjusting, by the SMPS control circuit, the TCO frequency of the control signal such that the voltage feedback signal decreases approximately linearly.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
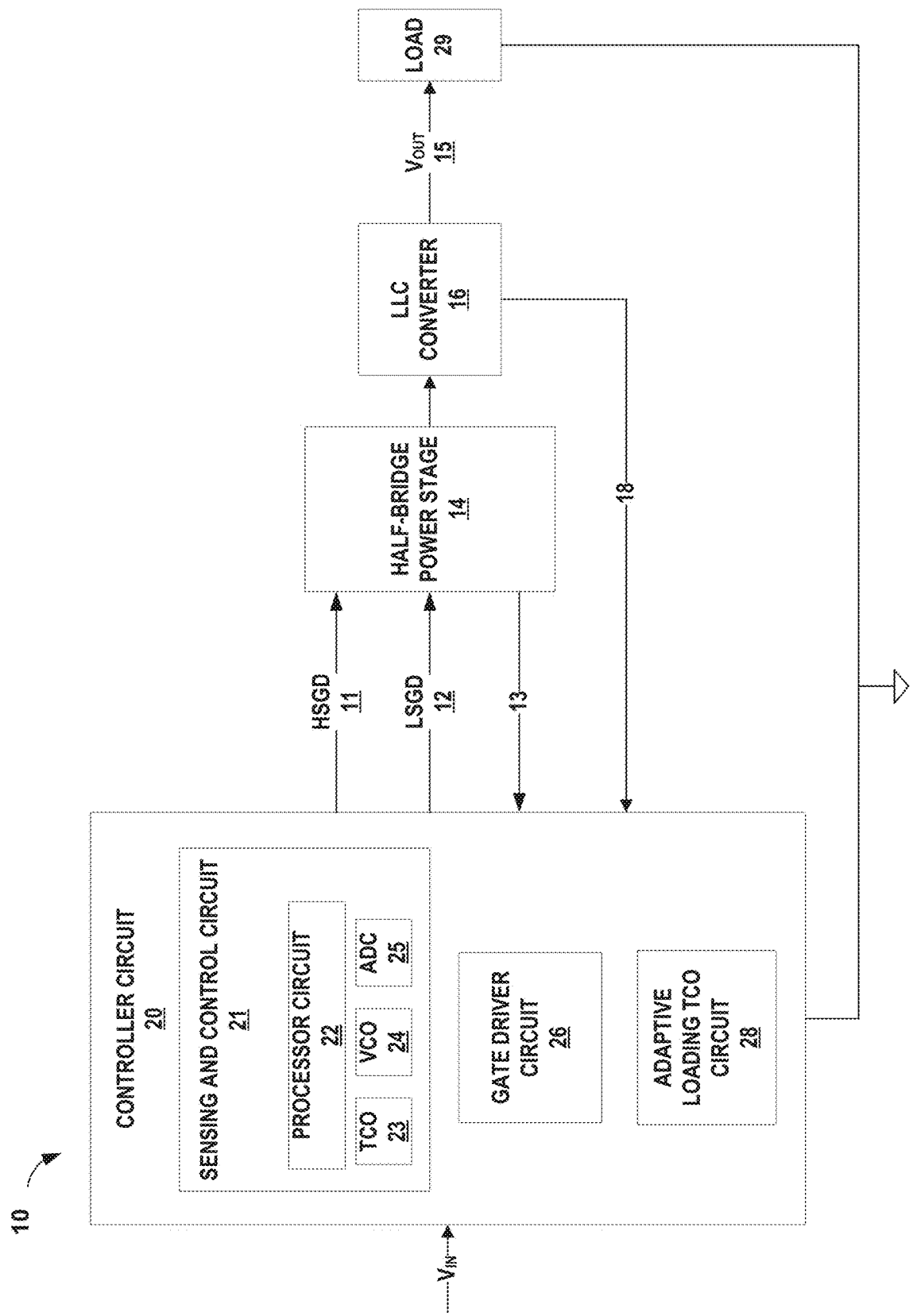
FIG. 1 is a block diagram illustrating an example system including an LLC converter and an adaptive loading TCO compensation circuit according to one or more techniques of this disclosure.

This disclosure directed to techniques that cause a switched mode power supply (SMPS) to output a smoothly rising voltage ($V_{OUT}$) during startup and still operate efficiently during steady state. A smoothly rising $V_{OUT}$ that avoids a negative voltage slope and voltage overshoot may be desirable in some applications, such as a power supply unit (PSU) for computer equipment. The techniques of this disclosure include adding an adaptive loading time controlled oscillator (TCO) compensation circuit to a controller for the SMPS. The adaptive loading TCO compensation circuit may adjust the TCO frequency based on the drop rate slope (dv/dt) of the feedback voltage from the half-bridge ($V_{HBFB}$) and the load on the SMPS. The TCO compensation circuit may adjust the TCO operating frequency to linearly regulate $V_{HBFB}$ drop rate.

Because the $V_{HBFB}$ drop rate depends the load supplied by the SMPS, for light load the TCO compensation circuit may increase the effective TCO frequency at approximately the same time as the circuit detects $V_{HBFB}$. By adjusting the TCO frequency when the beginning of $V_{HBFB}$ is being sensed, the TCO compensation circuit may lower the response as early as possible and avoid output voltage overshoot and avoid the risk of a negative voltage slope in $V_{OUT}$. For a high load, $V_{HBFB}$ may have a steep drop rate slope (i.e. high dv/dt). The TCO compensation circuit may adjust the TCO frequency as needed to linearly regulate $V_{HBFB}$ and avoid a fast, continuous frequency increase that may cause voltage controlled oscillator (VCO) over compensation. In other words, the TCO compensation circuit adapts to the loading and self-adjusts the regulation speed for the handover point between the TCO and the voltage controlled oscillator (VCO). The techniques of this disclosure improve the startup operation of an SMPS, such as an LLC converter, and may be used for example, with both voltage mode LLC or current mode LLC. For simplicity, this disclosure will focus on an LLC converter, though these techniques may be used with other types of SMPS. In this disclosure an LLC converter refers to a multi-resonant converter with resonant tank that includes three reactive elements: two inductors and a capacitor.

When an LLC controller circuit starts an LLC, a TCO within the controller outputs the system operating frequency from high to low over time. Within a few milliseconds, the $V_{HBFB}$ begins to pull down based on an increase in $V_{OUT}$. The VCO within the controller computes the VCO operating frequency according to the $V_{HBFB}$. When the VCO frequency is higher than TCO frequency, the LLC controller circuit causes the VCO to take over the system operating frequency, which may be called "handover," or TCO-to-VCO handover.

In some applications, certain performance factors may be desirable for startup, and for steady state. Some examples of performance factors include the time needed for $V_{OUT}$ to reach the regulated voltage to supply the load. In some examples this time may be approximately twenty milliseconds (ins) or less and may be called system charge response. Other performance factors may include a smoothly rising $V_{OUT}$ that avoids a negative voltage slope and voltage overshoot. In some examples voltage overshoot may be undesirable if it is greater than approximately five percent of the regulated voltage. In some applications, a SMPS may need to supply a wide power range from a high efficiency "low power mode" to a high activity mode that consumes more power and puts a high load on the SMPS. Tuning a controller circuit, for example, to have good startup performance under a high load may negatively impact other performance factors under other loading conditions.

When an LLC starts up, or similarly while it is starting up after a protection shutdown, the output energy flow should be progressively and smoothly increased to allow a slow buildup in output current and voltage. In some examples, the progressive increase may be called a "soft-start". Without a soft-start, in some cases the LLC converter circuit may draw high and potentially destructive currents from the input source and through the power transistors and other components in an attempt to charge the output capacitors and bring $V_{OUT}$ to the desired regulated value. At startup the output capacitors are discharged, the startup phase may be considered a short circuit. To minimize energy flow, the initial switching frequency from the TCO may be higher than the steady state resonance frequency. This allows the LLC converter to operate in the inductive region. The controller causes the TCO frequency to progressively decay until the output voltage comes close to the regulated value and the control loop closes. The VCO takes over the operating frequency to regulate the output voltage and current.

The techniques of this disclosure may provide several advantages to other LLC controller techniques. Some advantages may include adapting to a wide range of loads that a SMPS may supply without requiring further tuning or adjustment. In other words, the techniques of this disclosure adapt to loading which may make no load and maximum load both achieve similar rising waveform. Another advantage may also include providing more design margin to the feedback loop component. A smoothly rising voltage waveform during start-up may make the design effort easier when using an LLC controller circuit according to this disclosure for a particular application. For example, an LLC controller circuit according to this disclosure may gain the design margin for feedback component design, which may lower the design complexity of PSU performance factors such as startup, voltage ripple, dynamic load, and feedback loop gain margin (GM) and phase margin (PM). Other advantages may include providing a regulator for a fast dv/dt slope at startup and reducing the overall handover risk which may be caused by the secondary side feedback loop being saturated by a large signal during startup. In other words, the variable gain control may ensure a steep slope for the feedback voltage $V_{HBFB}$ until the cross-over point of the TCO to the VCO, which may help ensure the PSU switches the system frequency from the TCO to the VCO.

FIG. 1 is a block diagram illustrating an example system including an LLC converter and an adaptive loading TCO compensation circuit according to one or more techniques of this disclosure. The adaptive loading TCO compensation circuit may cause the LLC converter system 10 to output a smoothing rising output voltage to the load that avoids voltage overshoot and negative voltage slope during startup. The function of adaptive loading TCO compensation circuit 28 is described in terms of the LLC converter example of FIG. 1, though the techniques of this disclosure may be applicable to other types of power supply units, such as a flyback PSU, an LLC forward PSU, a half-bridge PSU, a full-bridge PSU, a phase shift fill-bridge PSU and similar PSUs.

System 10 in the example of FIG. 1 includes a controller circuit 20 that outputs gate driver signals to a half-bridge power stage 14, which is a circuit that performs power factor correction (PFC) for LLC converter 16. LLC converter 16 outputs a voltage ($V_{OUT}$ 15) to load 29. In the example of FIG. 1, system 10 acts as the DC-DC stage of a switched mode power supply (SMPS). Some examples of uses for system 10 may include use in a computer power supply, such as a desktop computer, server or similar load that may use a range of input power, depending on the mode of operation, though the techniques of this disclosure may be desirable in other applications. System 10 may be considered a system comprising an SMPS control circuit.

Controller circuit 20 may include sensing and control circuit 21, gate driver circuit 26 and adaptive loading TCO compensation circuit 28. The blocks within system 10 are for explanation purposes only. In other examples, functions of system 10 may be grouped in other ways and include functional blocks not described herein. Controller circuit 20 may control the output of LLC converter 16 based on programming instructions as well as feedback from signals within system 10.

Sensing and control circuit 21 may include processor circuit 22, time controlled oscillator (TCO) 23, voltage controlled oscillator (VCO) 24, analog-to-digital converter (ADC) 25 and other functions or components not shown in FIG. 1. Sensing and control circuit 21 may receive feedback signals such as $V_{HBFB}$ from half-bridge power stage 14, an indication of load current or temperature from LLC converter 16 via signal path 18, or other signals, not shown in FIG. 1. $V_{HBFB}$ may be one of the signals that follow signal path 13 from half-bridge power stage 14. In some examples, sensing and control circuit 21 may receive sampled and digitized signals, such as $V_{HBFB}$, via ADC 25. In some examples, sensing and control circuit 21 may also include a multiplexor (not shown in FIG. 1) that receives signals and outputs signals to ADC 25 or to processor 22.

During startup TCO 23 may output the system operating frequency from high to low over time. In some examples the signal output by TCO 23 may be considered a control signal that includes the TCO frequency. After a few milliseconds, the output voltage $V_{OUT}$ 15 begins to increase, as does the feedback voltage $V_{HBFB}$. As the feedback voltage $V_{HBFB}$ increases, the frequency of VCO 24 increases. When frequency of VCO 24 is higher than the frequency of TCO 23, the sensing and control circuit 21 causes VCO 24 to take over the system operating frequency and the TCO-to-VCO handover point. TCO 23 may be purposed to decrease the system operating frequency over a time period to provide a smoothly rising $V_{OUT}$. After handover, controller circuit may be further configured to block or turn-off the control signal from TCO 23 and output the control signal from VCO 24, in response to the VCO frequency exceeding a frequency threshold based on the frequency of TCO 23.

After startup, VCO 24 may supply the system frequency based on the feedback voltage $V_{HBFB}$ from half-bridge power stage 14. In some examples $V_{HBFB}$ is proportional to $V_{OUT}$ 15 and may be isolated from $V_{OUT}$ 15, such as by an optoisolator. In some examples the signal output by VCO 24 may be considered a control signal that includes the VCO frequency. The design of a VCO may consider the loop gain margin and phase margin (GM/PM) as well as the dynamic and ripple requirements for system operation. In some examples, adding compensation delay may help stabilize the system during normal operation. However, compensation delay, which may be desirable for normal operation may be in conflict with system startup during handover. Compensation delay may cause the handover point to be lower than the normal operation VCO settling definition. In addition, the voltage feedback $V_{HBFB}$ may decrease after handover. This compensation delay may enlarge the frequency gap during handover. In some examples, a compensation delay may result in a negative slope during startup.

Processor 22 may receive feedback signals via. ADC 25, zero crossing indications as well as other signals from sources outside system 10, such as temperature sensors or control signals. Processor 22 may include a memory location with programming instructions for how to control the half-bridge power stage 14 and LLC converter 16. Processor 22 may also manage safety functions such as overvoltage and over current protection, over temperature protection, automatic restarting, and other functions. Examples of processor 22 may include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and the integrated processing circuitry may be realized as fixed hardware processing circuitry, programmable processing circuitry and/or a combination of both fixed and programmable processing circuitry.

Gate driver circuit 26 may output gate control signals to drive a high side and/or low side power transistor within half-bridge power stage 14 to regulate the output voltage and current to load 29. For example, gate driver circuit 26 may output high side gate driver signal HSGD 11 and low side gate driver signal LSGD 12. Gate driver circuit 26 may output the gate driver signals based on the operating frequency. The operating frequency depends on the control signal from TCO 23 early in the startup phase and on VCO 24 after the TCO-to-VCO handover. In other words, the operating frequency for half-bridge power stage 14 is based on the control signal from either TCO 23 or VCO 24.

In some examples, adaptive loading TCO compensation circuit 28 is configured to receive $V_{HBFB}$ and to adjust the frequency of TCO 23 such that the voltage feedback signal $V_{HBFB}$ decreases approximately linearly. In other words, such that the change of $V_{HBFB}$ over time (dV/dt) voltage drop rate is approximately linear. In some examples adaptive loading TCO compensation circuit 28 may be implemented in controller circuit 20 as a separate circuit as shown in the example of FIG. 1. In other examples, adaptive loading TCO compensation circuit 28 may be implemented as software instructions to be carried out by processor circuit 22. In other examples, adaptive loading TCO compensation circuit 28 may be implemented as some combination of additional circuitry and functions carried out by other blocks within controller circuit 20. For example, adaptive loading TCO compensation circuit 28 may receive $V_{HBFB}$ information via ADC 25.

In examples in which adaptive loading TCO compensation circuit 28 receives the $V_{HBFB}$ signal from ADC 25, ADC 25 may have a minimum output and a maximum output, based on the specifications of ADC 25, such as the number of bits, the ADC range, the quantization size of the least significant bit (LSB), the ADC speed and other parameters. Adaptive loading TCO compensation circuit 28 may be configured to adjust the frequency of TCO 23 as soon as $V_{HBFB}$ is detectable. In other words, as soon as $V_{HBFB}$ registers on the output of ADC 25, for example at the maximum voltage of the ADC. Described a different way, during startup, the LLC on-time is linearly increased until feedback from $V_{HBFB}$ is sensed. Controller circuit 20 may control the operating frequency from TCO 23 to linearly regulate $V_{HBFB}$ drop rate. Adaptive loading TCO compensation circuit 28 may compensate the operating frequency from TCO 23 based on the $V_{HBFB}$ drop rate and the load current to load 29. For example, for a light load (low load current) adaptive loading TCO compensation circuit 28 may immediately raise the operating frequency for a few clock cycles as soon as $V_{HBFB}$ is sensed by ADC 25, followed by linear regulation $V_{HBFB}$ as the startup process continues. Immediately adjusting the operating frequency during the TCO portion as soon as $V_{HBFB}$ is sensed by have the advantage of avoiding overshoot.

In the example of a controller circuit without an adaptive loading TCO compensation circuit 28, a TCO with a fixed decreasing frequency slope may be tuned for an 'average' output load current. In the example of a light load, a slowly decreasing frequency slope may reduce the risk of a negative slope in $V_{OUT}$ 15 during startup. But in the example of a maximum load current, a fixed frequency slope that decreases too slowly may lead the output raising time to be out of specification. In other words, the charge response, which is the time for $V_{OUT}$ to increase to the desired output voltage may be too slow. The desired output voltage may be the regulated voltage predetermined during the SMPS design process and dependent on the characteristics of load 29. The adaptive loading TCO compensation circuit 28 of this disclosure may have the advantages of allowing system 10 to supply a wide power range for load 29 during start-up while still outputting a smoothly rising $V_{OUT}$ 15 that minimizes the risk of overshoot and negative slope. As regulatory requirements worldwide drive the reduction of standby power consumption, the ability to supply a wide power range provided by the techniques of this disclosure may be desirable in a SMPS.

Figure 2:
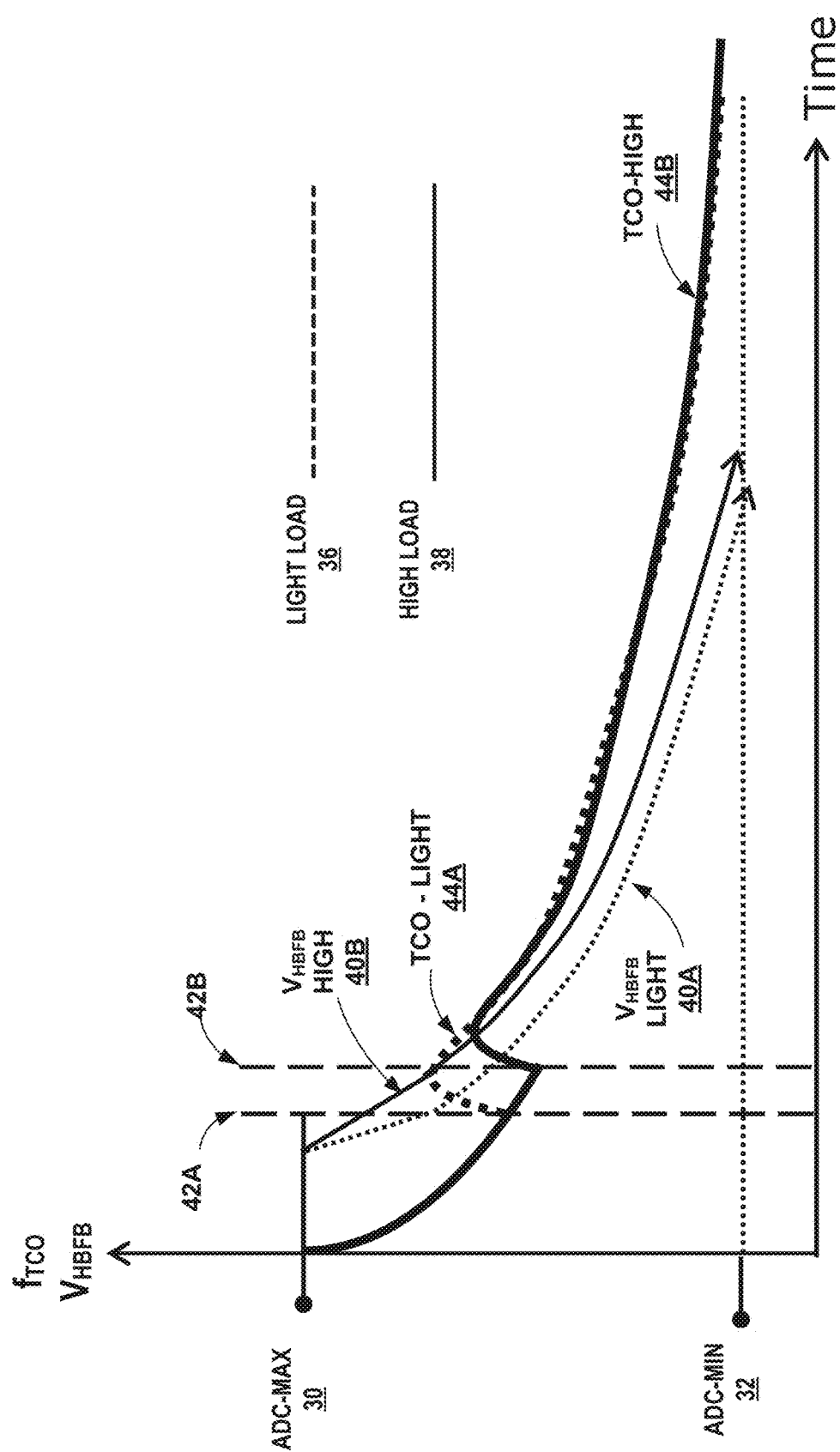
FIG. 2 is a time graph illustrating an example response of a circuit to a high load and a light load according to one or more techniques of this disclosure.

FIG. 2 is a time graph illustrating an example response of a SMPS circuit to a high load and a light load according to one or more techniques of this disclosure. The adaptive loading TCO compensation circuit, such as adaptive loading TCO compensation circuit 28 described above in relation to FIG. 1, may compensate the operating frequency from the TCO depending on the load and the $V_{HBFB}$ drop rate (dV/dt). The example of FIG. 2 shows the feedback voltage from the half-bridge $V_{HBFB}$ and the TCO frequency ($f_{TCO}$) during startup.

As the TCO frequency decreases during startup, $V_{OUT}$ (not shown in FIG. 2) may increase while $V_{HBFB}$ decreases, because the voltage feedback signal $V_{HBFB}$ is based on the output voltage $V_{OUT}$. For a light load 36 (low current), where the startup current for a load is low, the drop rate for $V_{HBFB}$ may be steep, when compared to the drop rate for a high load. The adaptive loading TCO compensation circuit may immediately raise the operating frequency for a few clock cycles as soon as $V_{HBFB}$ drops below the maximum ADC voltage 30 (ADC-max), that is, when $V_{HBFB}$ is sensed by the ADC, such as ADC 25 described above in relation to FIG. 1. This is shown in FIG. 2 as the TCO-Light curve 44A. After the initial increase, the adaptive loading TCO compensation circuit may then decrease the operating frequency to cause $V_{HBFB}$, as shown by $V_{HBFB}$—light curve 40A, to linearly decrease.

For a high load 38, with high current demand from the load during startup, $V_{HBFB}$—high 40B may have a more shallow dV/dt. Adaptive loading TCO compensation circuit may delay the TCO increase, when compared to the lightly loaded condition, as shown by TCO-High 44B. Following the frequency increase, the circuit may decrease the operating frequency such that $V_{HBFB}$ high 40B decreases linearly, as shown in FIG. 2. Below the ADC min 32, the adaptive loading TCO compensation circuit may not read the value of $V_{HBFB}$.

Figure 3:
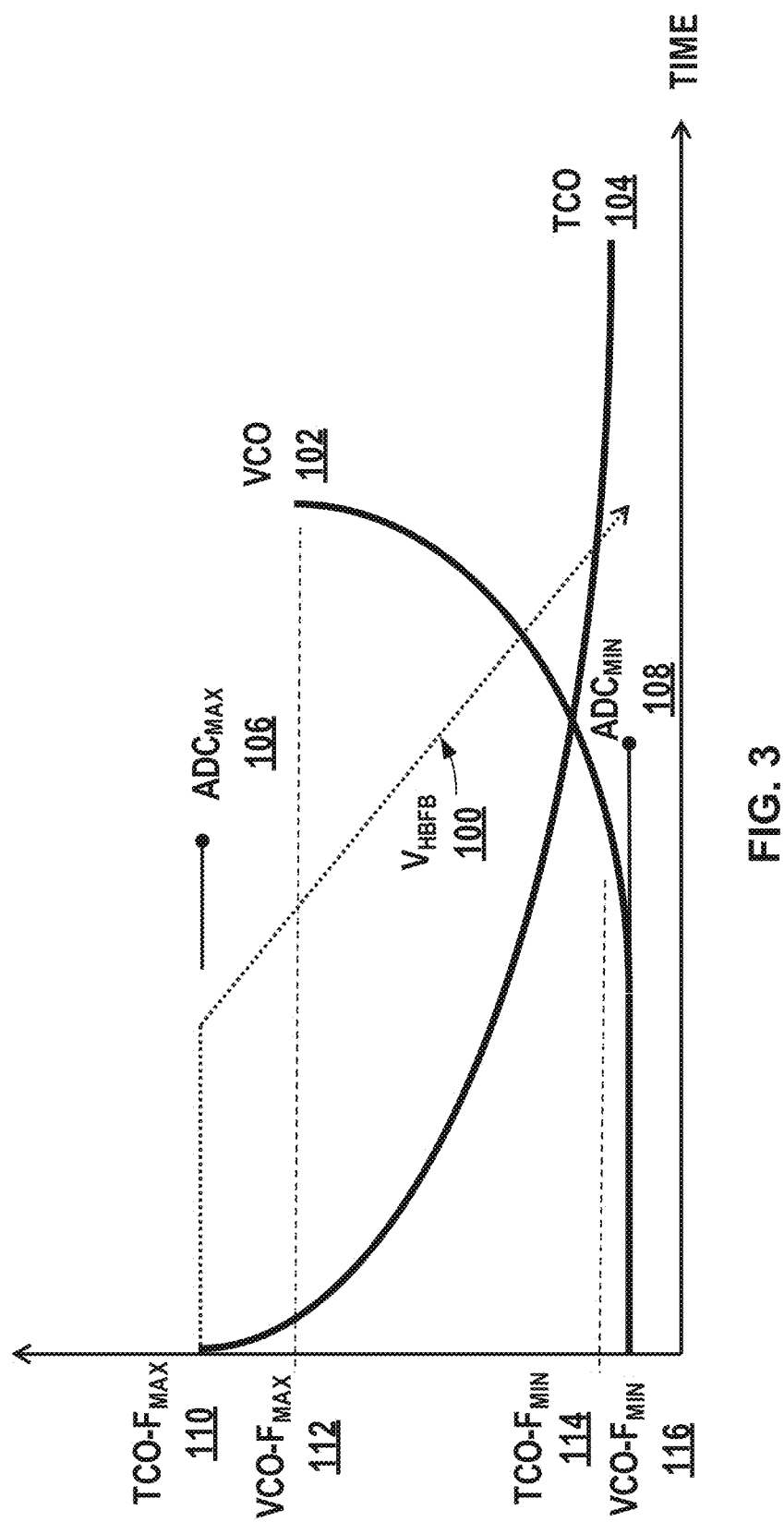
FIG. 3 is a time graph illustrating an example of the operation of a TCO and VCO of a SMPS controller circuit during startup.

FIG. 3 is a time graph illustrating an example of the operation of a TCO and VCO of a SMPS controller circuit during startup. FIG. 3 illustrates an example of the TCO to VCO handover without an adaptive loading TCO compensation circuit.

As described above, during startup, the controller circuit may operate the LLC converter at much higher than the resonant frequency, to control the startup current. The controller circuit may decrease the TCO 104 frequency from the maximum TCO frequency TCO-$f_{MAX}$ 110, to ensure a linear drop rate for $V_{HBFB}$ 100. The controller circuit, such as controller circuit 20 described above in relation to FIG. 1, may begin to detect $V_{HBFB}$ 100 once the voltage level for $V_{HBFB}$ 100 drops below the ADC max 106. As $V_{HBFB}$ 100 decreases, the VCO frequency 102 increases from the minimum VCO frequency, VCO-$f_{MIN}$ 116, and may increase as high as the maximum VCO frequency, VCO-$f_{MAX}$ 112. Once the VCO frequency 102 increase above a predetermined threshold (not shown in FIG. 3) the controller circuit may cause the VCO to take over the operating frequency. The predetermined threshold may be based on the TCO frequency 104 and be close to the LLC converter resonant frequency. Below the ADC min 108, the controller circuit may not be able to detect $V_{HBFB}$. $V_{HBFB}$ may be considered as a part of an energy and loading detector. When VHBFB drops, it may be desirable for the system frequency to avoid a fast, continuous increase after VCO handover.

Figure 4:
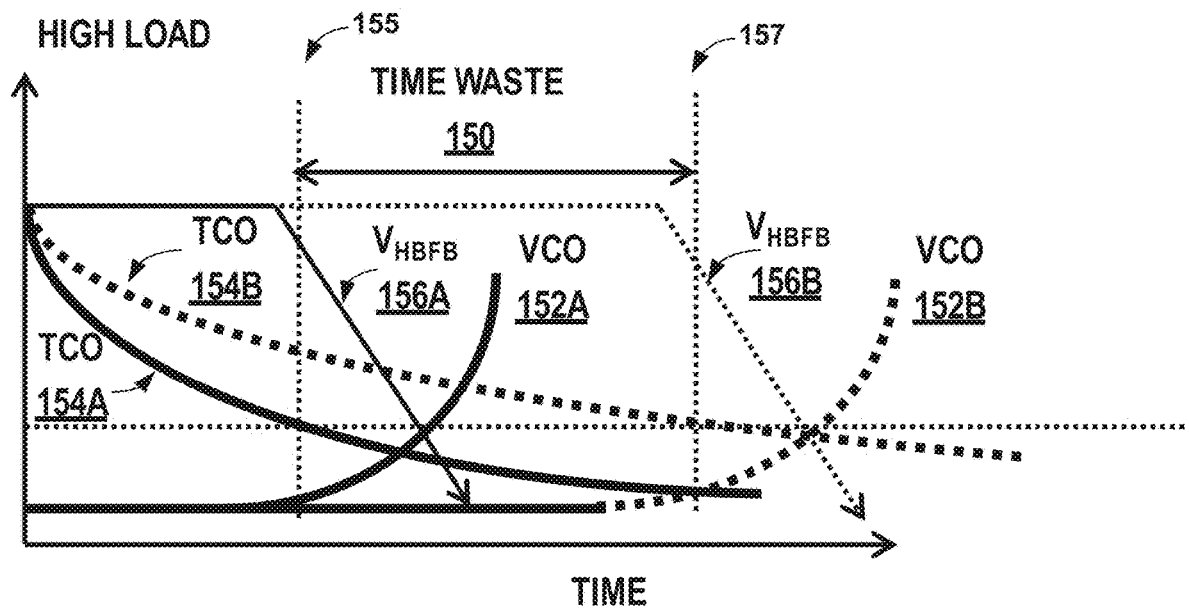
FIG. 4 is a time graph illustrating the impact on startup of an LLC using an example SMPS controller circuit with an extended time TCO.

FIG. 4 is a time graph illustrating the impact on startup of an LLC using an example SMPS controller circuit with an extended time TCO. The time graph of FIG. 4 illustrates the TCO to VCO handover without an adaptive loading TCO compensation circuit.

Similar to the TCO to VCO handover illustrated in FIG. 3, the TCO frequency curve 154A begins at a high frequency to manage the initial currents, as described above. As the TCO frequency 154A decreases, feedback voltage $V_{HBFB}$ 156A eventually begins to decrease near the time indicated by 155 as $V_{OUT}$ (not shown in FIG. 4) increases. The time at 155 indicates the TCO frequency 154A when $V_{HBFB}$ 156A is at ADC-max, similar to ADC-max 30 as depicted in FIG. 2. As $V_{HBFB}$ 156A decreases, the VCO frequency 152A increases. When the VCO frequency 152A exceeds the predetermined threshold greater than the TCO frequency 154A, the VCO frequency takes over the operating frequency.

In some examples a TCO may be tuned to reduce frequency at a slower rate, which may reduce the risk of a negative slope as $V_{OUT}$ increases. However, in examples where the load is high during startup, the charge response of the circuit may slower than desired for certain applications. In other words, $V_{OUT}$ may reach the desired regulated voltage in a longer time than the predetermined time desired. This is illustrated by the time delay 150.

In a more detailed example, TCO frequency 154B may decrease at a slower rate than TCO frequency 154A. This may mean that $V_{HBFB}$ 156B does not decrease until just before the time indicated by 157, which is the point at which TCO frequency 154B drops low enough for VCO frequency 152B to be greater than TCO frequency 154B and handover to occur.

In contrast, the techniques of this disclosure, which include an adaptive loading TCO compensation circuit may compensate the TCO frequency depending on the load and the slope of $V_{HBFB}$ as described above in relation to FIG. 2. A SMPS circuit according to the techniques of this disclosure may be configured to achieve performance factors such as charge response with smoothly rising $V_{OUT}$ that also reach regulated voltage in a shorter time than a fixed time TCO.

Figure 5:
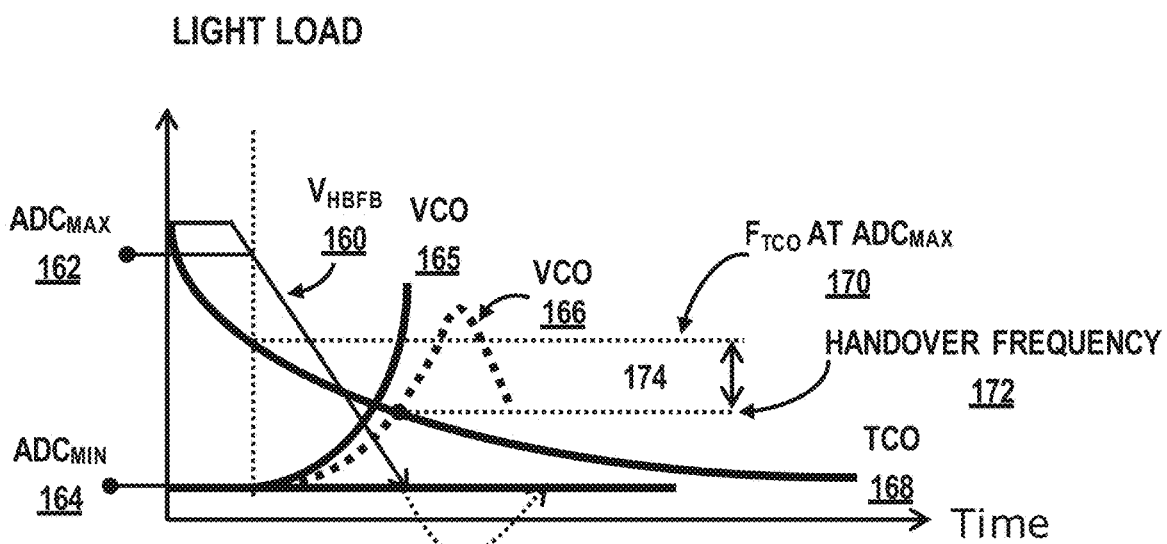
FIG. 5 is a time graph illustrating the impact on startup of an example LLC circuit with an extended compensation delay in the feedback loop.

FIG. 5 is a time graph illustrating the impact on startup of an example LLC circuit with an extended compensation delay in the feedback loop circuit. The time graph of FIG. 5 illustrates the TCO to VCO handover without an adaptive loading TCO compensation circuit.

The control loop for the VCO may be tuned to account for the loop GM and PM, the range of the dynamic load and steady state voltage ripple in $V_{OUT}$. In some examples, the control loop may include an additional compensation delay, which may help stabilize the system during normal operation. However, an additional compensation delay may cause undesirable effects during startup, such as cause the handover point to be lower than the steady state VOC settling definition, when $V_{OUT}$ reaches the desired regulated voltage. The compensation delay may cause an enlarged frequency gap during handover and may increase the risk of a negative slope in the charge response during startup, especially for a light load.

The frequency gap 174 may be seen as the difference in frequency between the TCO frequency at ADC-max 170 compared to the handover frequency 172. As described above, in relation to FIGS. 2-4, as TCO frequency 168 decreases, $V_{OUT}$ increases (not shown in FIG. 5) and $V_{HBFB}$ 160 begins to decrease. At the beginning of $V_{HBFB}$ 160 detection, i.e. when $V_{HBFB}$ 160 is at ADC-max 162, TCO frequency 168 is at 170.

In this example, the VCO frequency may not follow VCO frequency curve 165 and settle out at a steady state. Instead, the feedback voltage $V_{HBFB}$ 160 may cause the VCO frequency to follow VCO 166 and cause the handover point to be lower than the desired VCO settling frequency. In some examples, the feedback voltage $V_{HBFB}$ continue to decrease below ADC-min 164 after handover, as shown by 171.

In contrast, the adaptive loading TCO compensation circuit of this disclosure, may compensate the TCO frequency slope to account for the light load. An SMPS circuit that includes an adaptive loading TCO compensation circuit may reduce the handover risk caused by secondary side feedback loop being saturated by large signal during startup. The techniques of this disclosure may also have the advantage of a system that gives a variable gain to control the feedback voltage $V_{HBFB}$ 160 for linear drop. In some examples the linear drop may be on the order of one LSB of the ADC over 32 microseconds (μs), or 1LSB-ADC/32 us. A well-defined $V_{HBFB}$ drop rate (dV/dt) may result in a well-defined handover time. Other advantages may include the TCO frequency may be self-adjusted to the loading, which may result in a smoothly rising $V_{OUT}$ waveform over time over a range of startup loads. This self-adjustment may make the design effort for an end user less complicated because, for example, a circuit according to the techniques of this disclosure may have design margin for components in the feedback loop. The design margin may require less effort to determine a desirable value of components to meet the desired ripple, dynamic load and loop GM and PM because the startup behavior is well defined. The reduced effort may come from a reduced need to balance startup behavior with steady state behavior when designing the feedback loop.

Figure 6A:
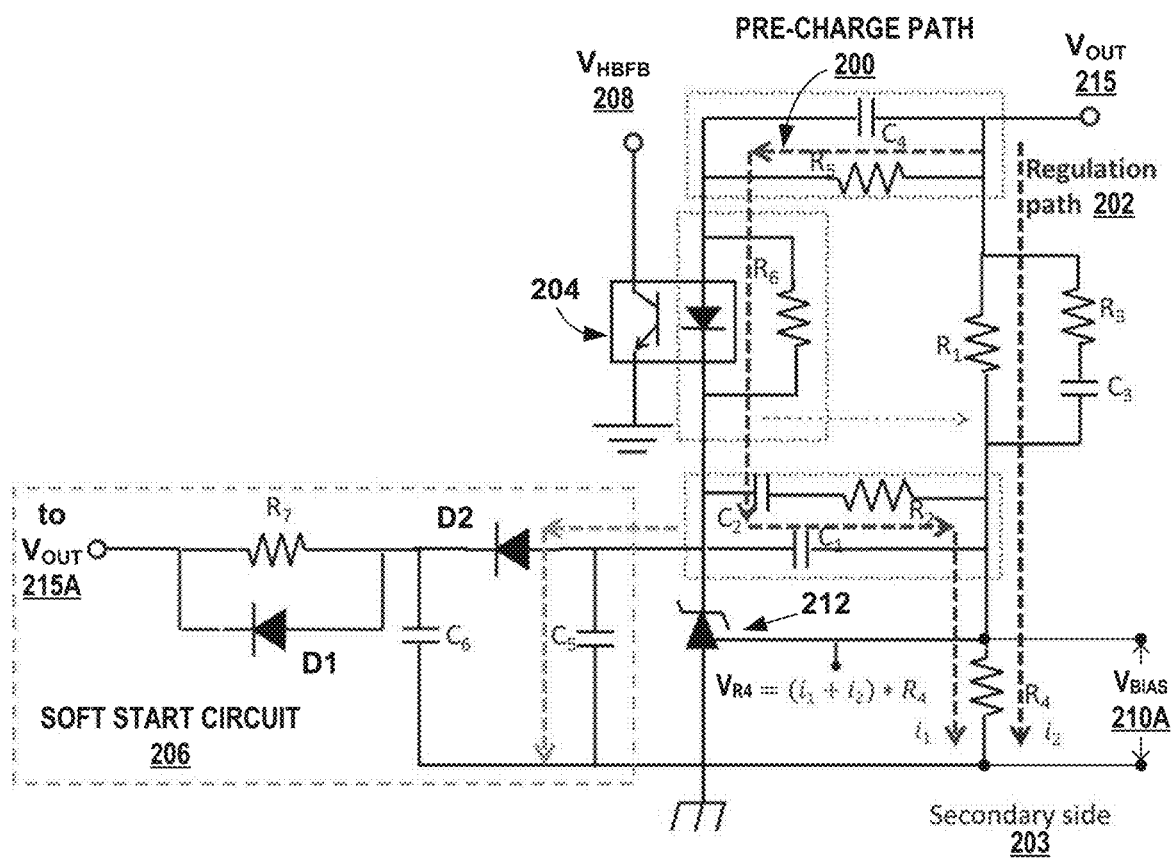
FIG. 6A is a schematic diagram of an example feedback loop illustrating the current paths during startup.

FIG. 6A is a schematic diagram of an example feedback loop illustrating the current paths during startup. FIG. 6A illustrates how the feedback loop circuit may set the bias voltage during startup when compared to during steady state operation. In some examples, the circuit of FIG. 6A may be included in the half-bridge power stage 14 block depicted in FIG. 1. In other examples, portions of the circuit of FIG. 6A may be included in the LLC converter 16 block of FIG. 1 while other portions may be included in half-bridge power stage 14.

The circuit of FIG. 6A includes $V_{OUT}$ 215, which is similar to $V_{OUT}$ 15 depicted in FIG. 1. $V_{OUT}$ (215 connects to ground through resistor R1 in series with resistor R4. $V_{OUT}$ 215 also connects to optoisolator 204 through the parallel combination of capacitor C4 in parallel with resistor R5. Resistor R6 is coupled in parallel with optoisolator 204. Resistor R1 is in parallel with the series combination of resistor R3 in series with capacitor C3, such that $V_{OUT}$ (215 also connects to ground through the series combination of R3 and C3. Optoisolator ensures the voltage feedback signal $V_{HBFB}$ 208 is based on the output voltage $V_{OUT}$ 215, but $V_{HBFB}$ 208 is also isolated from the output voltage. Note that phrase "open circuit potential" (OCP) means the voltage is measured against a reference electrode using a high impedance measurement so that no current flows between the electrode in question and the reference electrode.

The cathode terminal of optoisolator 204 connects to the cathode terminal of shunt regulator 212. One example of shunt regulator 212 may include the TL431 and TL432 three-terminal adjustable shunt regulators by Texas Instruments. A shunt regulator may be modeled as an adjustable Zener diode, as shown in FIG. 6A. The cathode of shunt regulator 212 connects to the reference terminal of shunt regulator 212 through the capacitor C1, which is in parallel with the series combination of capacitor C2 and resistor R2. The reference terminal of shunt regulator 212 also connects to ground through resistor R4. The voltage on R4 ($V_{R4}$) is $V_{BIAS}$ 210A.

In addition to the secondary side circuit 203, the circuit of FIG. 6A also includes soft start circuit 206. Soft start circuit 206 includes a connection to $V_{OUT}$ 215, indicated by $V_{OUT}$ our 215A. Soil start circuit 206 monitors $V_{OUT}$ 215 through terminal $V_{OUT}$ 215A. Terminal $V_{OUT}$ 215A connects to the cathode of diode D1, which is in parallel with resistor R7. The cathode of diode D2 connects to the anode of diode D1, resistor R7 and capacitor C6. Capacitor C6 is between the cathode of D2 and ground. The anode of D2 connects to ground through capacitor C5. The anode of D2 connects to the secondary side circuit 203 at the cathode terminal of shunt regulator 212. In some examples the secondary side circuit 203 may be referred to as a secondary side feedback loop.

In the example of the circuit of FIG. 6A, bias voltage $V_{BIAS}$ 210A is determined by pre-charge path 200 and regulation path 202. The circuit may be subject to AC current flow through the compensation loop that includes C1, C2 and R2. The AC current flow may cause $V_{BIAS}$ 210A to reach a voltage high enough to turn on shunt regulator 212. In other words, the AC current flow through the compensation loop $V_{OUT}$ 215 is changing during startup may dominate $V_{BIAS}$ 210A, causing the reference terminal of shunt regulator 212 to turn on the shunt regulator. As shown, $V_{BIAS}$ 210A is set according to the equation:

$$V_{BIAS}=V_{R4}=(i_1+i_2) \times R_4$$

where i1 is the current through the pre-charge path 200 and i2 is the current through the regulation path. During startup, i1 may dominate i2.

Therefore, in some examples, choosing the values for the components, such as C1, C2, R2 and so on, to fine tune the control loop circuit's poles and zeros to meet the systems specifications for dynamic load, voltage ripple, loop gain and other performance specifications for a particular application may cause undesirable impacts to the startup behavior. As describe above in relation to FIG. 5, some undesirable impacts may include negative voltage slope, or voltage overshoot in the charge response.

In examples including soft start circuit 206, may reduce the dominate impact of the C1, C2 and R2 path during startup by charge sharing. However, soft start circuits may cause other undesirable effects such as a lower loop response. For example, capacitor C5 may slow the loop response time in steady state.

Figure 6B:
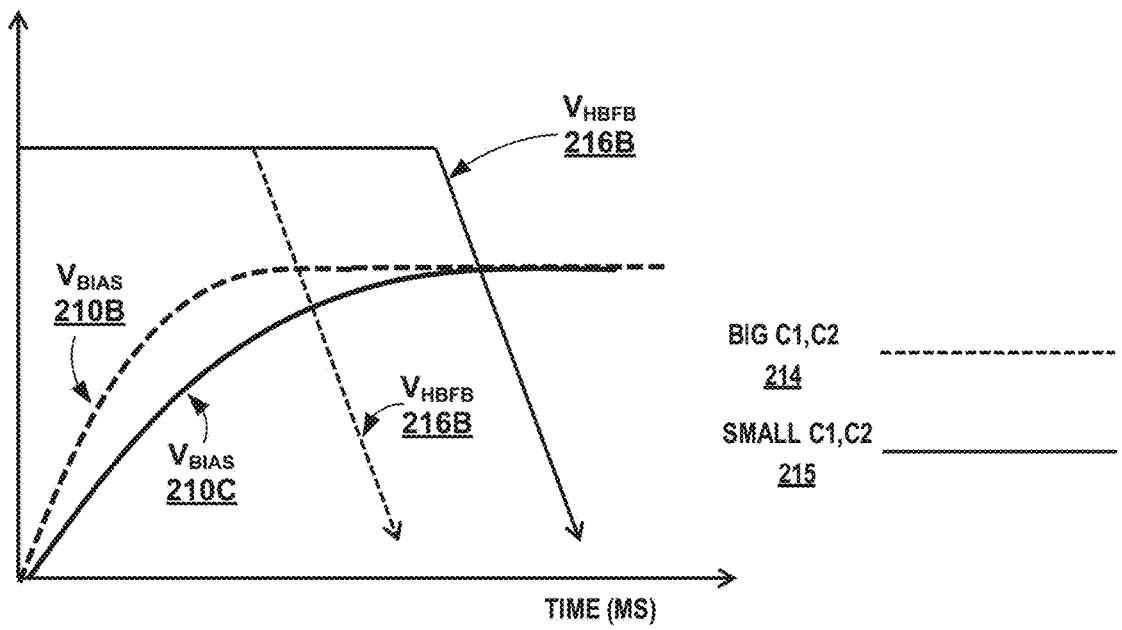
FIG. 6B is a time graph illustrating the impact of different sized capacitors in the feedback loop during startup.

FIG. 6B is a time graph illustrating the impact of different sized capacitors in the feedback loop during startup. The time graph of FIG. 6 illustrates startup performance without an adaptive loading TCO compensation circuit. The startup value of b for pre-charge path 200 is influenced by the value of C1 and C2. The factor of it is gradually reduced during startup after the $V_{BIAS}$ 210A reaches the bias point for shunt regulator 212 as depicted in FIG. 6A.

In one example, selecting a large value for C1 and C2 (214) may result in a $V_{BIAS}$ curve 210B with a steeper slope than a $V_{BIAS}$ curve 210C with smaller values for C1 and C2 (215). The feedback voltage $V_{HBFB}$ 216B with larger values (214) may decrease sooner than $V_{HBFB}$ 216B with smaller values (215). Some examples of smaller values for C1 and C2 may include a C1=220 picoFarads (pF) and a C2=100 nanoFarads (nF). An example of a larger value of C2 may include C2=1 µF.

To continue the example above, selecting R1=1.5 kΩ and R2=8 kΩ may result in the below performance chart. The below chart shows the percentage of contribution to $V_{BIAS}$ during start up from the portions of the circuit depicted in FIG. 6A.

| Contribution path | C2 = 100nF | C2 = 1uF |
| --- | --- | --- |
| Compensation loop $C_2$ & $R_2$ | $\frac{638.4}{2455} = 26.00\%$ | $\frac{1090.60}{2455} = 44.42\%$ |
| Resistive voltage divider $R_1$ & $R_4$ | $\frac{1745.47}{2455} = 71.09\%$ | $\frac{1293.7}{2455} = 52.70\%$ |
| Others | 2.90% | 2.88% |
| Total | 100% | 100% |

The values above are for illustration purposes only. The selection of component values depends on the needs of a particular application and can be any value needed to fine tune the control loop circuit's poles and zeros to meet the systems specifications. As described above, the techniques of this disclosure with an adaptive loading TCO compensation circuit may ease the design burden by compensating the TCO frequency change based such factors as the startup load and $V_{HBFB}$ slope.

Figure 7A:
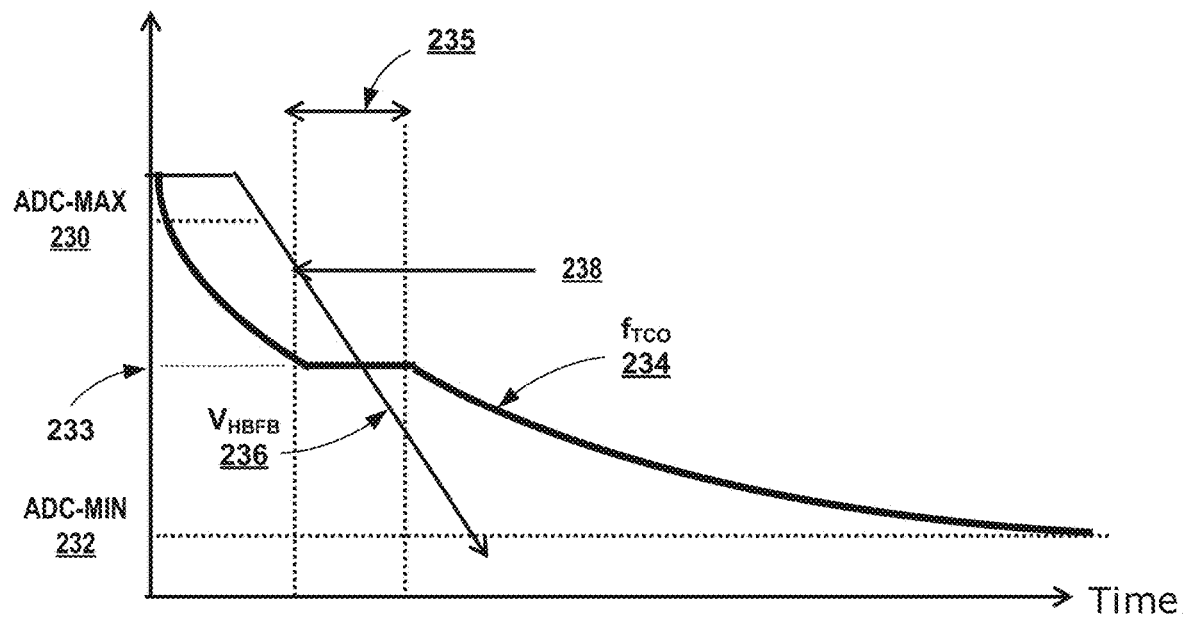
FIG. 7A is a time graph illustrating a startup operation of an LLC converter circuit using an example SMPS controller circuit using a TCO freeze circuit.

FIG. 7A is a time graph illustrating a startup operation of an LLC converter circuit using an example SMPS controller circuit using a TCO freeze circuit. The TCO freeze circuit of FIG. 7A may allow the TCO to decrease frequency ($f_{TCO}$ 234) to a predetermined frequency 233, then freeze the TCO frequency for a predetermined duration 235. After specified TCO freeze duration 235, a controller circuit may linearly decrease the LLC frequency ($f_{TCO}$ 234) until VCO handover. The VCO frequency response is not shown in FIG. 7A for clarity. In some examples of the TCO freeze circuit, the stop frequency, or freeze frequency as well as the stop or freeze duration may be configured to meet the needs of a particular application. In other examples, the controller circuit, such as controller circuit 20 depicted in FIG. 1, may decrease the TCO frequency until $V_{HBFB}$ 236 reaches a predetermined voltage level 238. The controller circuit may freeze or stop the TCO frequency change at the stop frequency 233 for a predetermined duration 235. After predetermined TCO stop duration 235, the controller may cause the TCO frequency ($f_{TCO}$ 234) to linearly decrease until VCO handover when the VCO takes over the LLC frequency.

Figure 7B:
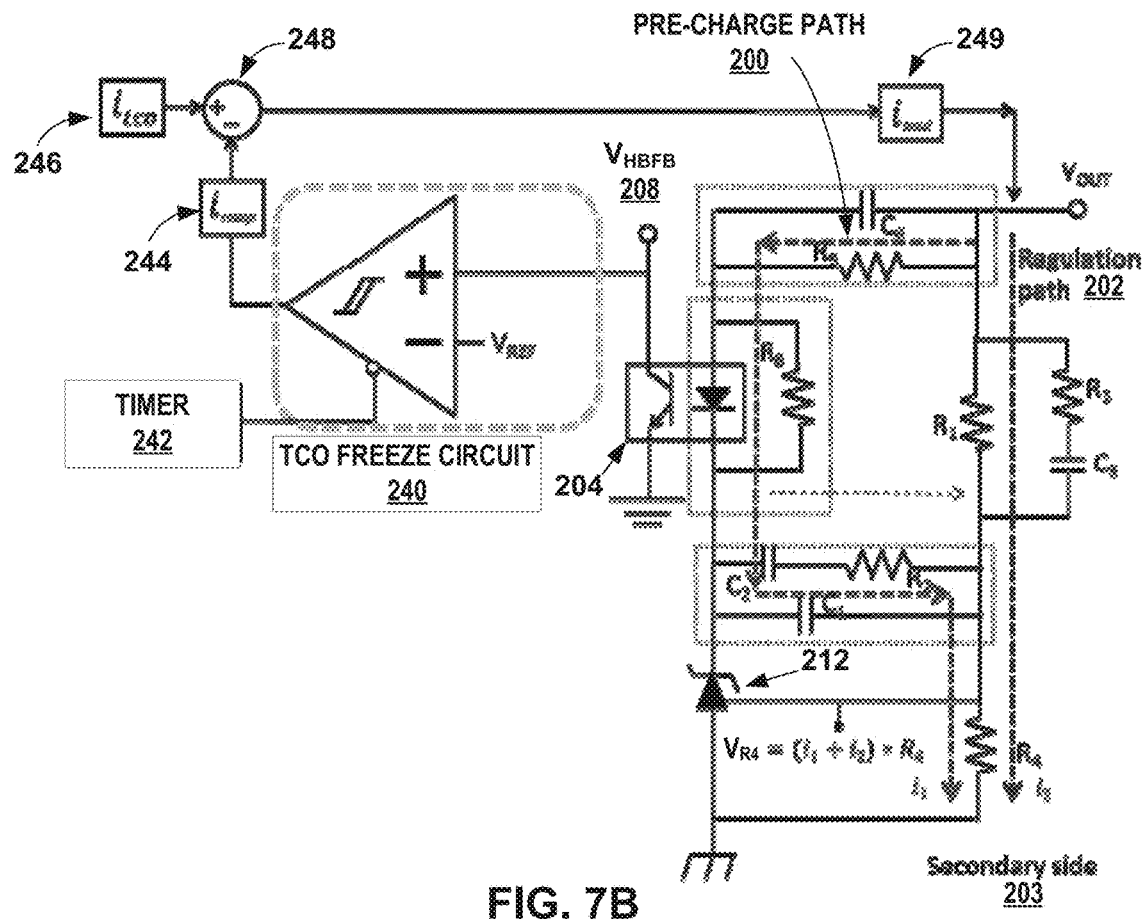
FIG. 7B is a schematic diagram illustrating an example implementation of a TCO freeze circuit.

FIG. 7B is a schematic diagram illustrating an example implementation of a TCO freeze circuit. The example circuit of FIG. 7B does not include an adaptive loading TCO compensation circuit, such as adaptive loading TCO compensation circuit 28 described above in relation to FIGS. 1 and 2.

The circuit of FIG. 7B includes the same secondary side circuit 203 described above in relation to FIG. 6A, including regulation path 202 and pre-charge path 200. A TCO freeze circuit 240 monitors the feedback voltage $V_{HBFB}$ 208 at one input and may connect to a timer 242 as another input. Timer 242 may set the stop duration 235 described above in relation to FIG. 7A. TCO freeze circuit 240 may output a signal to control a compensation current 244. The compensation current 244 may modify the current from the TCO 246 at summing junction 248 to result in total current 249. In this manner, TCO freeze circuit 240 may set a predetermined stop frequency and stop duration as describe above in relation to FIG. 7A.

Figure 8:
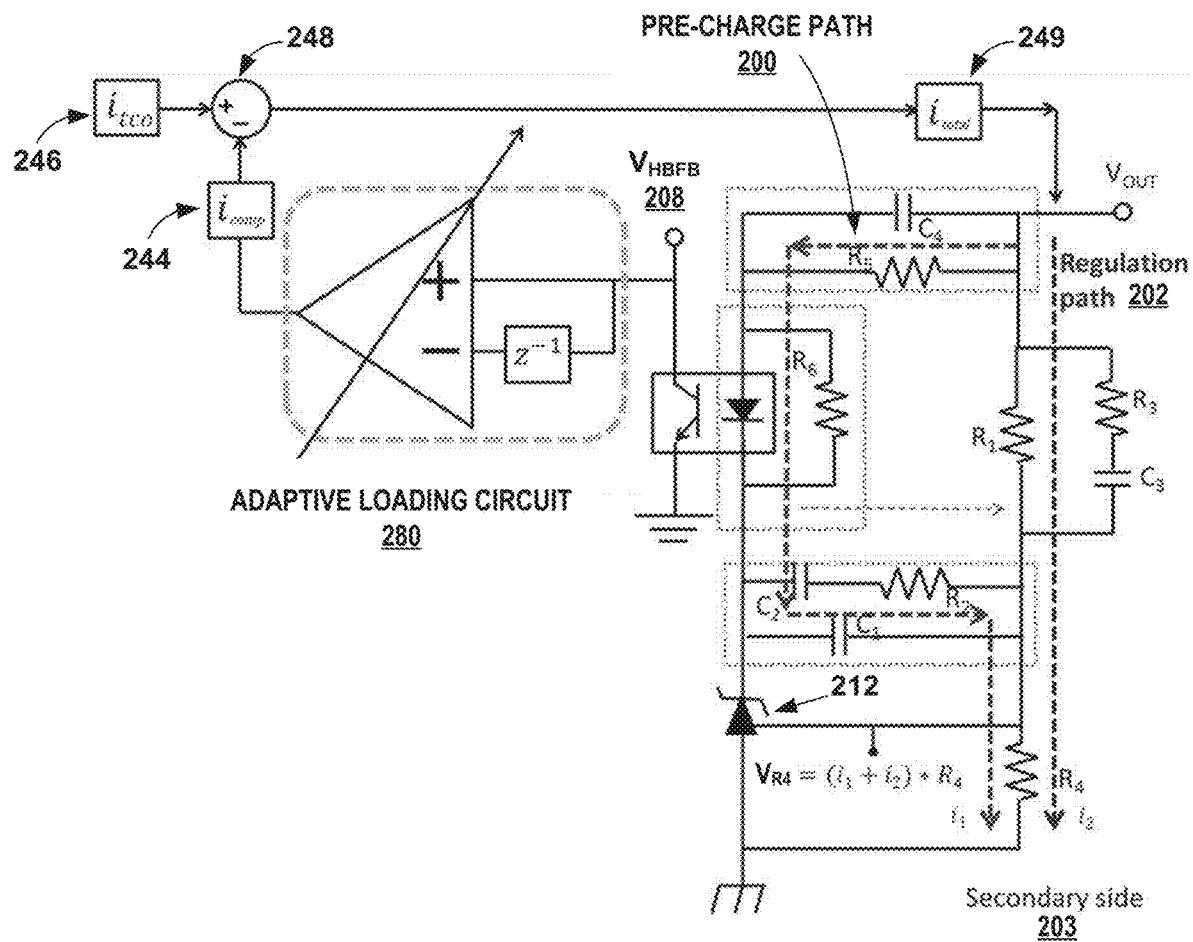
FIG. 8 is a schematic diagram illustrating an example implementation of an adaptive loading TCO compensation circuit according to one or more techniques of this disclosure.

FIG. 8 is a schematic diagram illustrating an example implementation of an adaptive loading TCO compensation circuit according to one or more techniques of this disclosure. Adaptive loading TCO compensation circuit 280 may be included in adaptive loading TCO compensation circuit 28 depicted in FIG. 1. The circuit of FIG. 8 includes the same secondary side circuit 203 described above in relation to FIGS. 6A and 7B, including regulation path 202 and pre-charge path 200.

Adaptive loading TCO compensation circuit 280 connects to the feedback voltage $V_{HBFB}$ 208. Similar to described above for the TCO freeze circuit, adaptive loading TCO compensation circuit 280 outputs a signal to control a compensation current 244. The compensation current 244 may modify the current from the TCO 246 at summing junction 248 to result in total current 249. In this manner adaptive loading TCO compensation circuit 280 may compensate the TCO frequency as described above in relation to FIGS. 1 and 2.

Adaptive loading TCO compensation circuit 280 includes feedback input element receives the voltage feedback signal $V_{HBFB}$ 208. As described above, adaptive loading TCO compensation circuit 280 is configured to adjust the TCO frequency of the control signal to summing junction 248, such that the voltage feedback $V_{HBFB}$ 208 signal decreases approximately linearly during startup. In other words, adaptive loading TCO compensation circuit 280 may be configured to adjust the TCO frequency based on the drop rate of the voltage feedback signal $V_{HBFB}$ 208.

Adaptive loading TCO compensation circuit 280 may be implemented with a variety of techniques, including hardware, such as an adjustable amplifier with a feedback element, as depicted in FIG. 8. Other techniques to implement adaptive loading TCO compensation circuit may include programming instructions that may be run by a processor within adaptive loading TCO compensation circuit 280, or by processor 22 in controller circuit 20 as described above in relation to FIG. 1.

As described above in relation to FIG. 2, adaptive loading TCO compensation circuit 280 may be further configured to adjust the TCO frequency by increasing the TCO frequency approximately simultaneous with a first detection of the voltage feedback signal by the ADC. In this manner, adaptive loading TCO compensation circuit 280 may avoid voltage overshoot in the charge response during startup.

The adaptive loading TCO compensation circuit may have some advantages over a fixed time TCO, or a TCO with a TCO freeze circuit, with the ability to supply a wide power range at startup. In some examples, a SMPS may be used in applications that include a demand from low power to high power, depending on the mode of operation. Regulatory requirements worldwide have driven a reduction of standby power consumption. By monitoring the startup feedback drop rate dv/dt information, the techniques of this disclosure may give a variable gain to control the feedback for linear drop in $V_{HBFB}$, which may be monitored by an ADC. Other advantages may include eliminating the soft start circuit 206, as depicted in FIG. 6A, reducing the overall handover risk, which may be caused by secondary side feedback loop 203 being saturated by large signal during startup, improving the design margin when selecting component values in the secondary side feedback loop 203 for "negative slope" and "output overshoot" during startup as described above in relation to FIGS. 6A and 6B. The self-regulation features of the techniques of this disclosure may resolve the balance between sometimes needing feedback to stop or freeze the LLC frequency to prevent output shoot, and sometimes need to the LLC to operate with continuous switching to avoid negative slope. This balance may be the result of the startup loading and the component choices in the secondary side feedback loop 203.

Figure 9A:
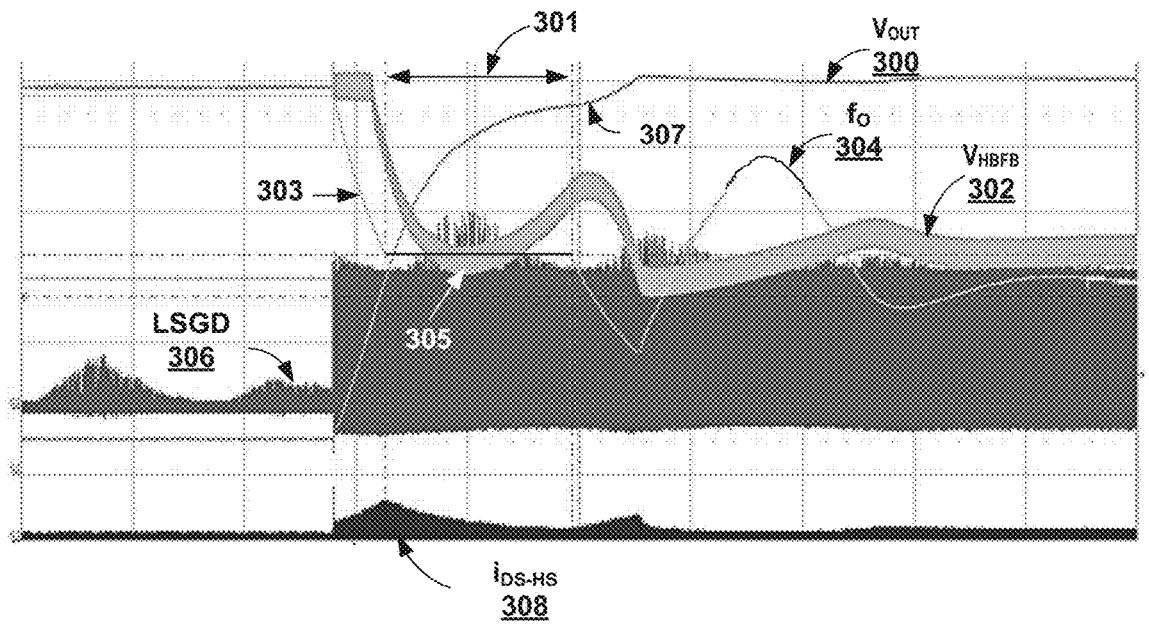
FIGS. 9A and 9B are time graphs comparing the startup operation of an LLC converter circuit using a TCO freeze circuit and an adaptive loading TCO compensation circuit with a light load on the LLC converter output.
Figure 9B:
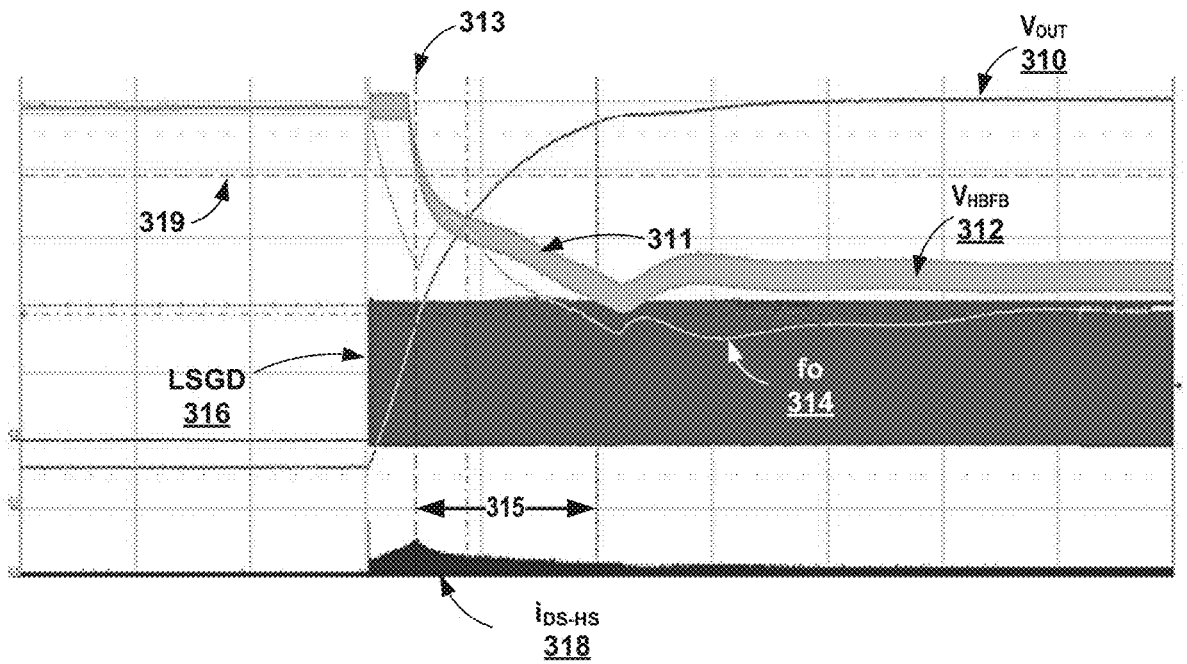

FIGS. 9A and 9B are time graphs comparing the startup operation of an LLC converter circuit using a TCO freeze circuit and an adaptive loading TCO compensation circuit with a light load on the LLC converter output. The example operation is for light load conditions of a load of zero amps and an input voltage of 90 VAC.

FIG. 9A illustrates the operation of an LLC converter circuit with a TCO freeze circuit. The output frequency, $f_O$ 304 is controlled by the TCO initially and by the VCO after handover. The TCO freeze circuit causes the TCO frequency 303 to stop decreasing during region 301. This allows a fairly rapid increase in $V_{OUT}$ 300, the charge response, with little overshoot. However as shown by region 307, $V_{OUT}$ 300 is not a smoothly rising voltage. $V_{HBFB}$ 302 displays a decrease at 305, then an increase for the rest of region 301, before settling.

The low side gate drive (LSGD) signal 306 increases in amplitude and frequency after startup. The drain-source current of the high side switch ins-Hs 308 peaks at approximately the time the TCO frequency freezes. Therefore, the startup performance with the TCO freeze circuit, though an improvement over a fixed time TCO circuit, includes some less desirable performance factors.

FIG. 9B illustrates the operation of an LLC converter circuit with an adaptive loading TCO compensation circuit under the same light load conditions, in contrast, charge response, shown by $V_{OUT}$ 310 shows a smooth, rapid increase to the regulated frequency, with no overshoot. LSGD 316 illustrates the gate signal activity and $i_{DS-HS}$ 318 peaks at approximately time indicated by 313.

As described above in relation to FIG. 2, the operating frequency $f_O$ 314 decreases until $V_{HBFB}$ 312 drops low enough below ADC-max 319 to be detected by the adaptive loading TCO compensation circuit (313). The adaptive loading TCO compensation circuit causes the TCO frequency to increase at the time indicated by 313, then decrease again. This increase causes a linear dv/dt in $V_{HBFB}$ 312 in region 311 over the time period 315. In this manner the adaptive loading TCO compensation circuit may provide advantages in startup charge response over other types of circuits.

Figure 10A:
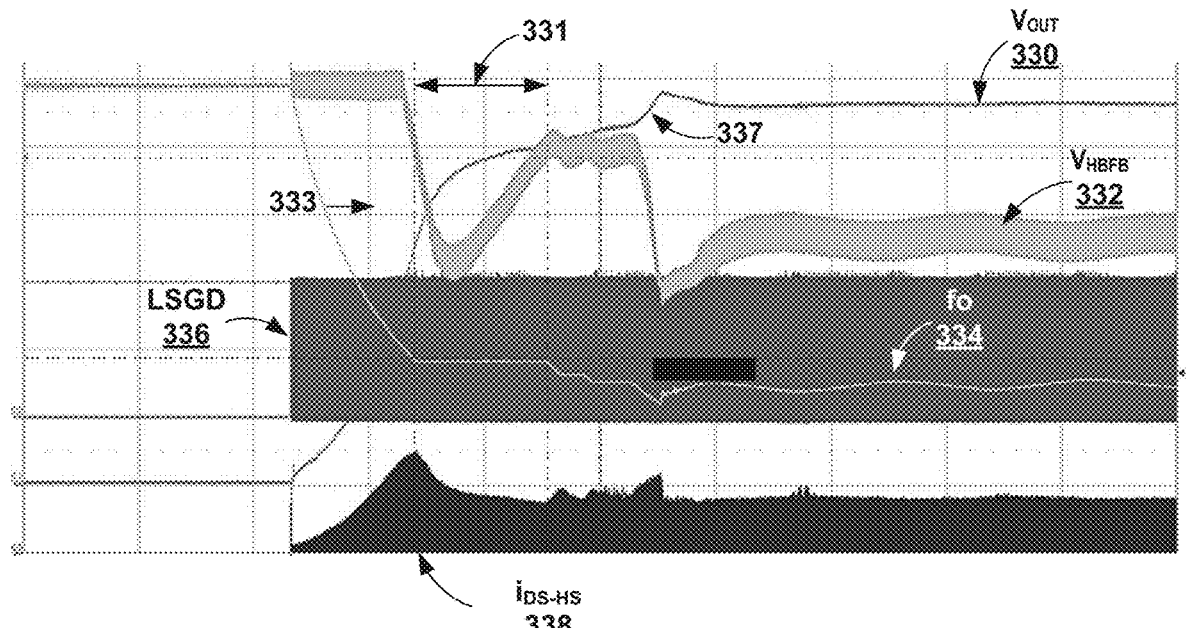
FIGS. 10A and 10B are time graphs comparing the startup operation of an LLC converter circuit using a TCO freeze circuit and an adaptive loading TCO compensation circuit with a high load on the LLC converter output.
Figure 10B:
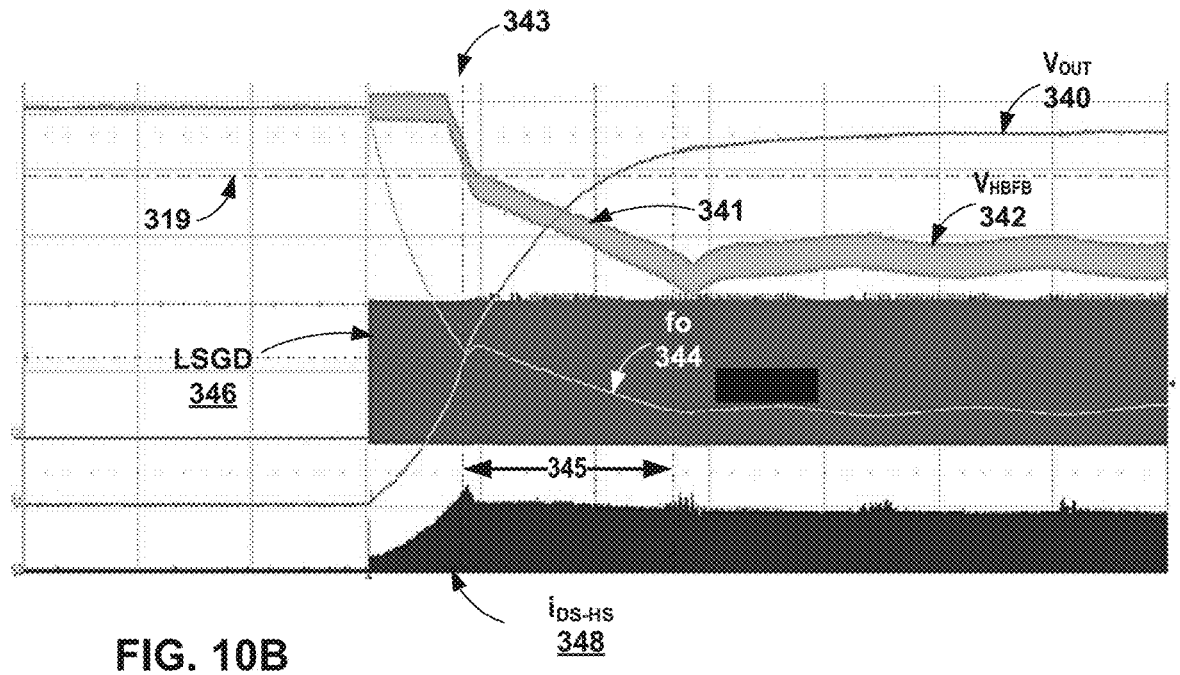

FIGS. 10A and 10B are time graphs comparing the startup operation of an LLC converter circuit using a TCO freeze circuit and an adaptive loading TCO compensation circuit with a high load on the LLC converter output. The example operation is for high load conditions of a load of 20 A (amps) and an input voltage of 90 VAC.

FIG. 10A illustrates the operation of an LLC converter circuit with a TCO freeze circuit. The TCO freeze circuit causes the output frequency, $f_O$ 334, controlled by the TCO initially to stop decreasing and hold steady during region 331. This allows a fairly rapid increase in $V_{OUT}$ 330, the charge response, which would be an improvement over a circuit without a TCO freeze circuit. However as shown by region 337, $V_{OUT}$ 330 is not a smoothly rising voltage and includes some overshoot. $V_{HBFB}$ 332 displays a decrease at 305, then an increase, along with some oscillation for the rest of region 331, before settling. Similar to FIGS. 9A and 9B above, the low side gate drive (LSGD) signal 336 increases in amplitude and frequency after startup. The drain-source current of the high side switch Ms-Hs 338 peaks at approximately the time the TCO frequency freezes.

The low side gate drive (LSGD) signal 306 increases in amplitude and frequency after startup. The drain-source current of the high side switch Ms-Hs 308 peaks at approximately the time the TCO frequency freezes. Therefore, the startup performance with the TCO freeze circuit, though an improvement over a fixed time TCO circuit, includes some less desirable performance factors.

FIG. 10B illustrates the operation of an LLC converter circuit with an adaptive loading TCO compensation circuit under the same high load conditions as FIG. 10A. In contrast, charge response of FIG. 10B, shown by $V_{OUT}$ 340 shows a smooth, rapid increase to the regulated frequency, with no overshoot. LSGD 346 illustrates the gate signal activity and $i_{DS-HS}$ 348 peaks at approximately time indicated by 343, with a general decrease in amplitude toward steady state V.

As described above in relation to FIG. 2, the operating frequency $f_O$ 314 decreases until $V_{HBFB}$ 342 drops low enough below ADC-max 319 to be detected by the adaptive loading TCO compensation circuit (313). In the example of FIG. 10B, ADC-max 319 is set to the same value as for the example of FIG. 9B. The adaptive loading TCO compensation circuit causes the TCO frequency to increase at the time indicated by 343, but to lesser extent when compared to FIG. 9B. This compensation, in response to the change in load, causes a linear dv/dt in $V_{HBFB}$ 342 over the time period 345. In this manner, the adaptive loading TCO compensation circuit may provide advantages in startup charge response over other types of circuits, such as the same circuit may provide a smoothly rising startup charge response over a wide range of loads.

Figure 11A:
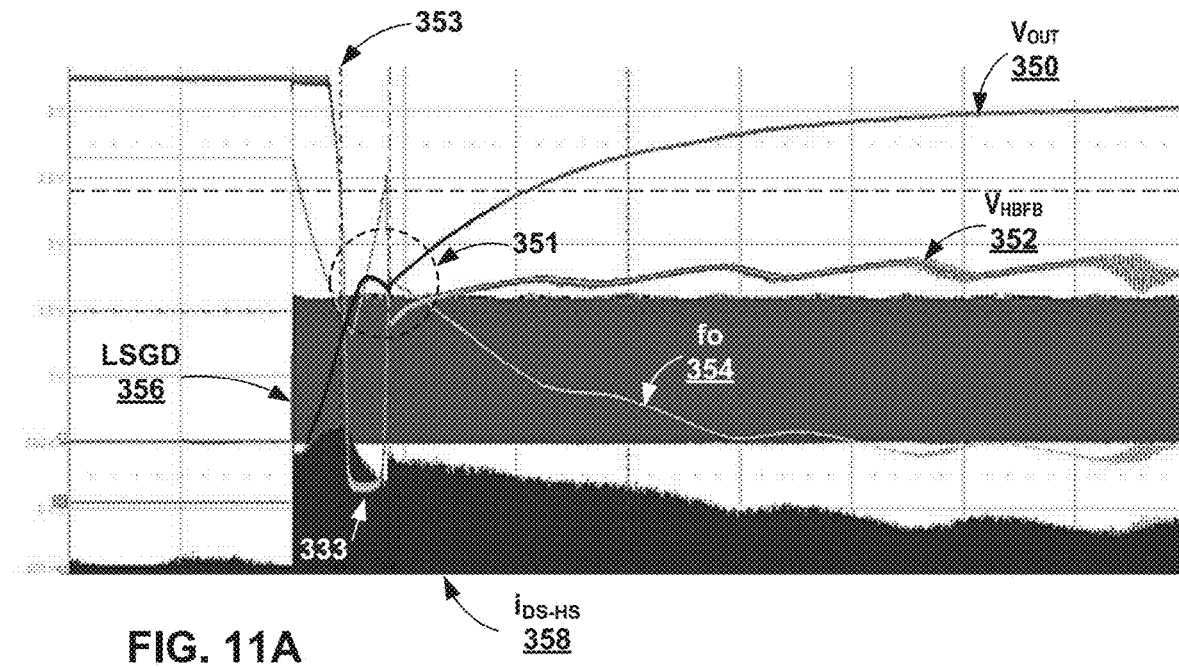
FIGS. 11A and 11B compare the impact on negative voltage slope during startup of an uncompensated SMPS controller and a TCO compensation circuit according to one or more techniques of this disclosure.
Figure 11B:
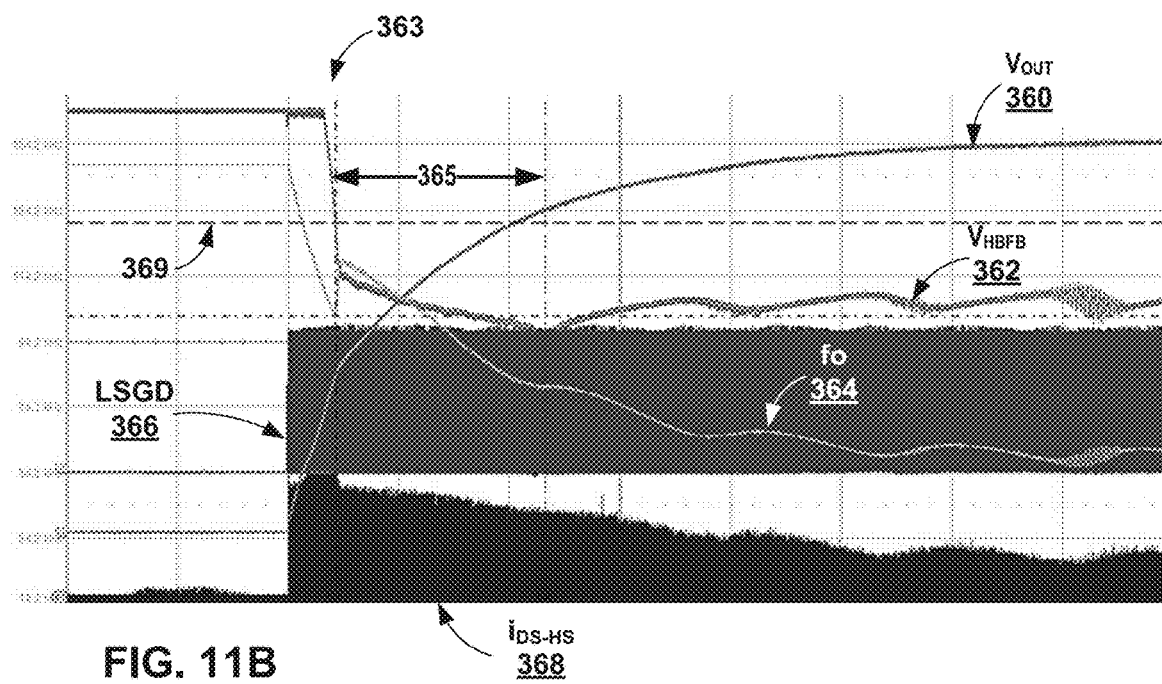

FIGS. 11A and 11B compare the impact on negative voltage slope during startup of an uncompensated SMPS controller and a TCO compensation circuit according to one or more techniques of this disclosure. The examples of FIGS. 11A and 11B are a 240 W system under a high startup load of 20A and an input voltage of 90 VAC.

Similar to described above in relation to FIGS. 9A-10B, in the example of FIG. 11A, LSGD 356 illustrates the gate signal activity and $i_{DS-HS}$ 358 peaks at approximately time indicated by 313. $V_{OUT}$ 350 has a negative slope in the region indicated by 351. The negative slope is caused by the rapid increase in operating frequency $f_O$ 354 caused by overcompensation in the feedback loop from the VCO, as seen in region 351. Details of the feedback loop function may be found, for example in the description of FIG. 6A above. The drop rate of $V_{HBFB}$ 352 at 333, caused by the high load conditions may cause early handover to the VCO and overcompensation.

The example of FIG. 11B illustrates the same circuitry and conditions as with FIG. 11A above, with the addition of an adaptive loading TCO compensation circuit according to one or more techniques of this disclosure. The charge response of $V_{OUT}$ 360 illustrates a smoothly rising voltage waveform with no negative slope. Similar to FIG. 2 above, the adaptive loading TCO compensation circuit causes the system operating frequency $f_O$ 364, to increase at approximately the same time 363 that $V_{HBFB}$ 362 crosses ADC-max 369. In other words, approximately simultaneously that $V_{HBFB}$ 362 becomes detectable by the adaptive loading TCO compensation circuit within the controller circuit. The TCO frequency behavior in the time region 365 causes a linear drop in $V_{HBFB}$ 362 during this time. LSGD 366 illustrates the gate signal activity and $i_{DS-HS}$ 368 peaks at approximately time indicated by 363.

The example of FIG. 11B illustrates how the adaptive loading TCO compensation circuit is configured to adjust the TCO frequency based on the drop rate of the voltage feedback signal $V_{HBFB}$ 362 and the load. FIG. 11B, along with FIG. 11A, also illustrate how the operating frequency $f_O$ 364 is a control signal comprising a first control signal, controlled by the TCO and a second control signal, controlled by the VCO. As described above in relation to FIGS. 1-3, the VCO is configured to output the second control signal including the VCO frequency, where the VCO frequency is based on the voltage feedback signal $V_{HBFB}$ 362. The control circuit may be configured to block or turn off the first control signal from the TCO and output the second control signal from the VCO in response to the VCO frequency exceeding a frequency threshold. By compensating the TCO frequency in response to the drop rate of $V_{HBFB}$ 362 and the load, the adaptive loading TCO compensation circuit may provide a more desirable charge response when compared to other types of circuits.

Figure 12A:
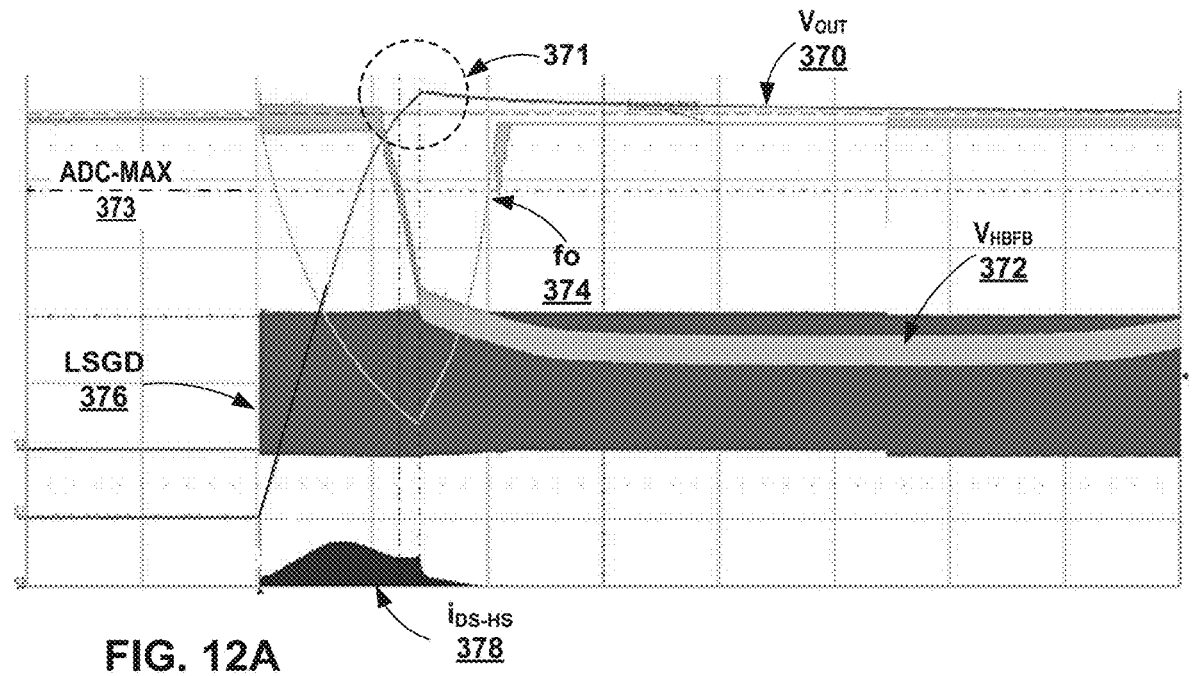
FIGS. 12A and 12B compare the impact on voltage overshoot during startup of an uncompensated SMPS controller and a TCO compensation circuit according to one or more techniques of this disclosure.
Figure 12B:
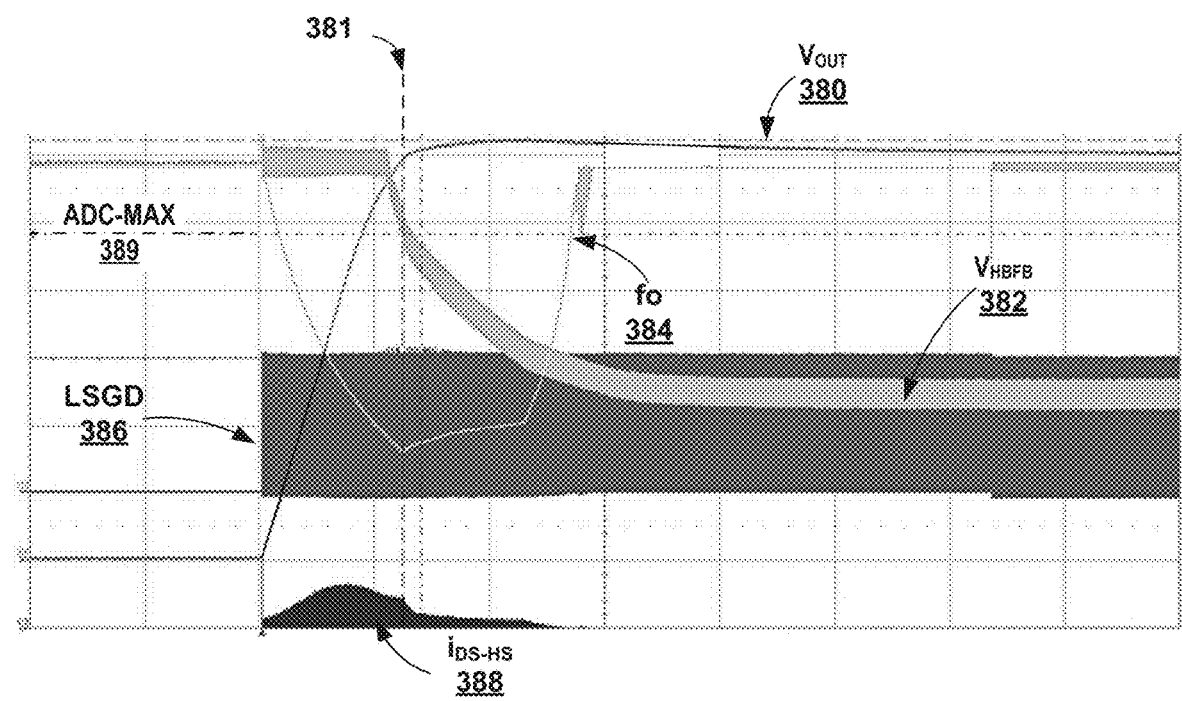

FIGS. 12A and 12B compare the impact on voltage overshoot during startup of an uncompensated SMPS controller and a TCO compensation circuit according to one or more techniques of this disclosure. The example operation is for light load conditions with a startup load of zero amps and an input voltage of 90 VAC.

FIG. 12A is a time graph of an uncompensated. SMPS controller circuit during startup and TCO to VCO handover. LSGD 376 illustrates the gate signal activity and $i_{DS-HS}$ 378 shows the drain-source current through the high side switch. The operating frequency $f_O$ 374, initially output by the TCO, decreases until the VCO handover point 373. The uncompensated TCO allows $V_{OUT}$ 370 to increase causing an overshoot at region 371. The increase in $V_{OUT}$ 370 has an associated steep drop rate for $V_{HBFB}$ 372. In the example of FIG. 12A, the overshoot reaches a voltage of 12.63V.

In the example of FIG. 12A, the adaptive loading TCO compensation circuit responds as soon as $V_{HBFB}$ 382 becomes detectable by compensating the TCO frequency, causing an increase in $f_O$ 384, similar to the behavior depicted in FIG. 2. The compensated TCO frequency causes an approximately linear drop rate in $V_{HBFB}$ 382 during the time period 385. At the end of time period 385, the VCO takes over control of the operating frequency $f_O$ 384.

The result of adding the adaptive loading TCO compensation circuit results in a smoothly rising charge response, with $V_{OUT}$ 380 reaching a voltage of 12.5 V with no overshoot, as seen in the uncompensated graph of FIG. 12A. As with the previous examples, LSGD 386 illustrates the gate signal activity and $i_{DS-HS}$ 388 shows the drain-source current through the high side switch.

Figure 13:
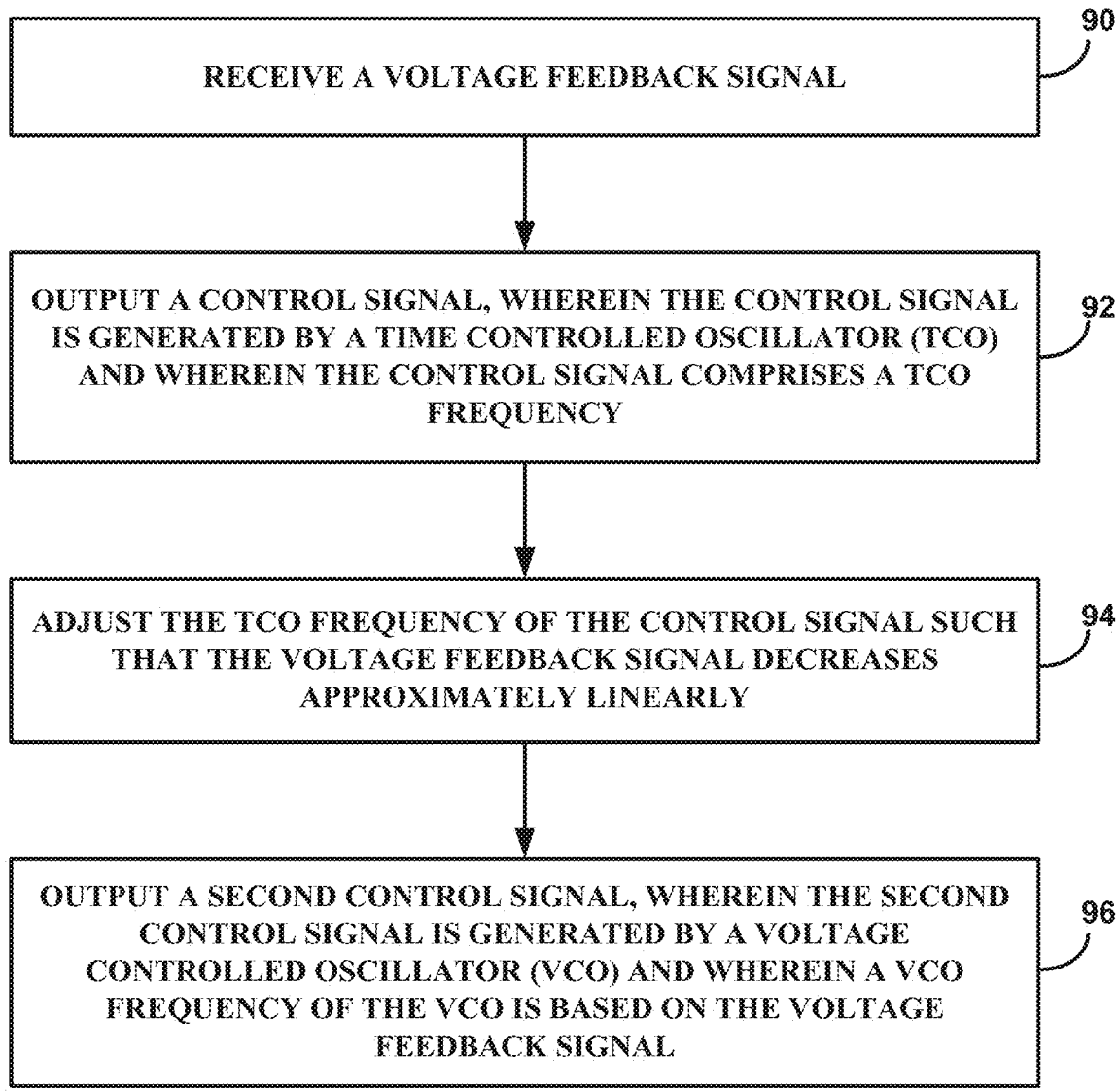
FIG. 13 is a flow diagram illustrating an example operation of a TCO compensation circuit according to one or more techniques of this disclosure.

FIG. 13 is a flow diagram illustrating an example operation of a TCO compensation circuit according to one or more techniques of this disclosure. The steps of FIG. 13 will be described in terms of FIGS. 1-3, unless otherwise noted.

The SMPS control circuit, such as controller circuit 20, may receive a feedback signal comprising $V_{HBFB}$ (90). In some examples, controller circuit 20 may receive $V_{HBFB}$ via signal path 13. $V_{HBFB}$ may provide an indication of the behavior of $V_{OUT}$ 15, and be optically isolated from $V_{OUT}$ 15, as depicted in FIG. 6A.

Controller circuit 20 may output a control signal comprising a system operating frequency generated by TCO 23 (92). The TCO frequency may start at a frequency higher than the steady state resonant frequency of the circuit and decrease at a predetermined rate to control the startup currents in the system.

Controller circuit 20 may include an adaptive loading TCO compensation circuit 28, adaptive loading TCO compensation circuit 28 may adjust the TCO frequency generated by TCO 23 such that $V_{HBFB}$ decreases approximately linearly (94), as depicted in FIGS. 9B, 10B, 11B and 12B. In some examples, adjusting the TCO frequency may include increasing the TCO frequency approximately simultaneously with a first detection of $V_{HBFB}$, i.e. when $V_{HBFB}$ is detectable by dropping below the max output of ADC 25. As described above, adaptive loading TCO compensation circuit 28 may adjust the TCO frequency based on the drop rate (dV/dt) of $V_{HBFB}$ and the startup load level.

The output frequency of VCO 24 depends on the voltage of $V_{HBFB}$. When the VCO frequency exceeds a predetermined threshold and the TCO frequency drops below a predetermined TCO frequency threshold, controller circuit 20 may outputting a second control signal generated by VCO 24 (96).

The techniques of this disclosure may offer several advantages over other types of SMPS controller circuits. The smoothly rising charge response, that automatically adapts to the startup load may ease the tuning effort of selecting components in the secondary side feedback loop, such as circuit 203 depicted in FIG. 6A.

Other advantages may include the frequency compensation factor depends on the $V_{HBFB}$ drop rate, which may avoid over-compensation during startup, leading to the negative slope in $V_{OUT}$. Also, the techniques of this disclosure do not conflict with original principle of the startup handover condition. That is, the TCO and VCO pass through a frequency cross-over point. When the VCO frequency is greater than the TCO frequency, the system executes the TCO-to-VCO handover. In addition, during the linear regulated $V_{HBFB}$ period, the system checks the $V_{HBFB}$ linear regulated rate. In examples in which $V_{HBFB}$ is no longer dropping, the TCO frequency will further decrease. In general, the adaptive loading TCO compensation circuit may ensure the maximum $V_{HBFB}$ dropping duration is less than the TCO time base to ensure the $V_{OUT}$ rise time reaches the predetermined regulation voltage within the desired rise time depending on the application, such as a computer power supply.

Example 1

A switched mode power supply (SMPS) control circuit, the circuit comprising: a time controlled oscillator (TCO), configured to output a control signal comprising a TCO frequency, and a TCO compensation circuit including a feedback input element. The feedback input element receives a voltage feedback signal, and the TCO compensation circuit is configured to adjust the TCO frequency of the control signal such that the voltage feedback signal decreases approximately linearly.

Example 2

The circuit of example 1, wherein the TCO compensation circuit is further configured to adjust the TCO frequency by increasing the TCO frequency approximately simultaneous with a first detection of the voltage feedback signal.

Example 3

The circuit of any of examples 1-2 or any combination thereof, wherein the voltage feedback signal comprises a drop rate and wherein the TCO compensation circuit is configured to adjust the TCO frequency based on the drop rate of the voltage feedback signal.

Example 4

The circuit of any combination of examples 1-3, wherein the TCO frequency decreases from a first frequency at a first time to a second frequency at a second time.

Example 5

The circuit of any combination of examples 1-4, wherein the control signal is a first control signal, the circuit further comprising a voltage controlled oscillator (VCO), wherein the VCO is configured to output a second control signal comprising a VCO frequency, wherein the VCO frequency is based on the voltage feedback signal, and wherein the circuit is further configured to block the first control signal and output the second control signal in response to the VCO frequency exceeding a frequency threshold.

Example 6

The circuit of any combination of examples 1-5, wherein the frequency threshold is based on the TCO frequency.

Example 7

A system comprising; an LLC converter circuit; and an LLC control circuit, the circuit comprising: a time controlled oscillator (TCO), configured to output a control signal comprising a TCO frequency, and a TCO compensation circuit including a feedback input element, wherein the feedback input element receives a voltage feedback signal. The TCO compensation circuit is configured to adjust the TCO frequency of the control signal such that the voltage feedback signal decreases approximately linearly.

Example 8

The system of example 7, wherein the TCO compensation circuit is further configured to adjust the TCO frequency by increasing the TCO frequency approximately simultaneous with a first detection of the voltage feedback signal.

Example 9

The system of any combination of examples 7-8, wherein the voltage feedback signal comprises a drop rate and wherein the TCO compensation circuit is configured to adjust the TCO frequency based on the drop rate of the voltage feedback signal.

Example 10

The system of any combination of examples 7-9, further comprising an LLC load, wherein the drop rate is based on the load.

Example 11

The system of any combination of examples 7-10, wherein the LLC converter is configured to output an output voltage, wherein the voltage feedback signal is based on the output voltage, wherein, during system startup, the system is configured to raise the output voltage to a predetermined voltage level within a predetermined time.

Example 12

The system of any combination of examples 7-11, wherein the predetermined time is twenty milliseconds.

Example 13

The system of any combination of examples 7-12, wherein the voltage feedback signal is optically isolated from the output voltage.

Example 14

The system of any combination of examples 7-13, further comprising a power stage circuit, wherein a power stage operating frequency is based on the control signal.

Example 15

A method comprising: receiving, by a switched mode power supply (SMPS) control circuit, a voltage feedback signal, outputting a control signal, by the SMPS control circuit, wherein the control signal is generated by a time controlled oscillator (TCO) and wherein the control signal comprises a TCO frequency, adjusting, by the SMPS control circuit, the TCO frequency of the control signal such that the voltage feedback signal decreases approximately linearly.

Example 16

The method of example 15, wherein adjusting the TCO frequency comprises increasing the TCO frequency approximately simultaneous with a first detection of the voltage feedback signal.

Example 17

The method of any combination of examples 15-16, wherein the voltage feedback signal comprises a drop rate and wherein adjusting the TCO frequency is based in part on the drop rate of the voltage feedback signal.

Example 18

The method of any combination of examples 15-17, wherein the TCO frequency decreases from a first frequency at a first time to a second frequency at a second time.

Example 19

The method of any combination of examples 15-18, wherein the voltage feedback signal is based on a load attached to an output of the SMPS.

Example 20

The method of any combination of examples 15-19, wherein the control signal is a first control signal, wherein the voltage feedback signal is an output of a feedback circuit, wherein a voltage at the output of the SMPS is an input to the feedback circuit, the method further comprising: outputting a second control signal, by the SMPS control circuit, wherein the control signal is generated by a voltage controlled oscillator (VCO) and wherein a VCO frequency of the VCO is based on the voltage feedback signal.

Various examples of the disclosure have been described. These and other examples are within the scope of the following claims.

The invention claimed is:

1. A switched mode power supply (SMPS) control circuit comprising:
   a time controlled oscillator (TCO), configured to output a control signal comprising a TCO frequency, wherein: an initial TCO frequency causes the SMPS to operate in an inductive region; the TCO frequency is configured to decrease over time based on a clock signal, until the TCO frequency reaches a predetermined TCO frequency threshold; and a TCO compensation circuit including a feedback input element, wherein the feedback input element receives a voltage feedback signal, and wherein the TCO compensation circuit is configured to adjust a frequency slope of the TCO frequency of the control signal such that the voltage feedback signal decreases approximately linearly.

2. The switched mode power supply (SMPS) control circuit of claim 1, wherein the TCO compensation circuit is further configured to adjust the frequency slope by temporarily increasing the TCO frequency approximately simultaneous with a first detection of the voltage feedback signal.

3. The switched mode power supply (SMPS) control circuit of claim 1, wherein the voltage feedback signal comprises a drop rate and wherein the TCO compensation circuit is configured to adjust the TCO frequency based on the drop rate of the voltage feedback signal.

4. The switched mode power supply (SMPS) control circuit of claim 1, wherein the TCO frequency decreases from a first frequency at a first time to a second frequency at a second time.

5. The switched mode power supply (SMPS) control circuit of claim 1, wherein the control signal is a first control signal,
   the switched mode power supply (SMPS) control circuit further comprising a voltage controlled oscillator (VCO), wherein the VCO is configured to output a second control signal comprising a VCO frequency, wherein the VCO frequency is based on the voltage feedback signal,
   and wherein the switched mode power supply (SMPS) control circuit is further configured to block the first control signal and output the second control signal in response to the VCO frequency exceeding a frequency threshold.

6. The switched mode power supply (SMPS) control circuit of claim 5, wherein the frequency threshold is based on the TCO frequency.

7. A system comprising: an LLC converter circuit; and an LLC control circuit, the circuit comprising: a time controlled oscillator (TCO), configured to output a control signal comprising a TCO frequency,
   wherein: an initial TCO frequency causes the LLC converter circuit to operate in an inductive region; the TCO frequency is configured to decrease over time based on a clock signal,
   until the TCO frequency reaches a predetermined TCO frequency threshold; and a TCO compensation circuit including a feedback input element, wherein the feedback input element receives a voltage feedback signal, wherein the TCO compensation circuit is configured to adjust a frequency slope of the TCO frequency of the control signal such that the voltage feedback signal decreases approximately linearly.

8. The system of claim 7, wherein the TCO compensation circuit is further configured to adjust the frequency slope by temporarily increasing the TCO frequency approximately simultaneous with a first detection of the voltage feedback signal.

9. The system of claim 7, wherein the voltage feedback signal comprises a drop rate and wherein the TCO compensation circuit is configured to adjust the TCO frequency based on the drop rate of the voltage feedback signal.

10. The system of claim 9, further comprising an LLC load, wherein the drop rate is based on the LLC load.

11. The system of claim 7,
    wherein the LLC converter is configured to output an output voltage,
    wherein the voltage feedback signal is based on the output voltage,
    wherein, during system startup, the system is configured to raise the output voltage to a predetermined voltage level within a predetermined time.

12. The system of claim 11, wherein the predetermined time is twenty milliseconds.

13. The system of claim 11, wherein the voltage feedback signal is optically isolated from the output voltage.

14. The system of claim 7, further comprising a power stage circuit, wherein a power stage operating frequency is based on the control signal.

15. A method comprising: receiving; by a switched mode power supply (SMPS) control circuit, a voltage feedback signal; outputting a control signal, by the skips control circuit, wherein the control signal is generated by a time controlled oscillator (TCO), wherein the control signal comprises a TCO frequency configured to decrease over time based on a clock signal, until the TCO frequency reaches a predetermined TCO frequency threshold;
    wherein an initial TCO frequency causes the SMPS to operate in an inductive region;
    adjusting, by the SMPS control circuit, a frequency slope of the control signal such that the voltage feedback signal decreases approximately linearly.

16. The method of claim 15, wherein adjusting the frequency slope comprises temporarily increasing the TCO frequency approximately simultaneous with a first detection of the voltage feedback signal.

17. The method of claim 15, wherein the voltage feedback signal comprises a drop rate and wherein adjusting the frequency slope is based in part on the drop rate of the voltage feedback signal.

18. The method of claim 15, wherein the TCO frequency decreases from a first frequency at a first time to a second frequency at a second time.

19. The method of claim 15, wherein the voltage feedback signal is based on a load attached to an output of the SMPS.

20. The method of claim 15,
wherein the control signal is a first control signal;
wherein the voltage feedback signal is an output of a feedback circuit,
wherein a voltage at the output of the SMPS is an input to the feedback circuit,
the method further comprising:
outputting a second control signal, by the SMPS control circuit, wherein the control signal is generated by a voltage controlled oscillator (VCO) and wherein a VCO frequency of the VCO is based on the voltage feedback signal.

* * * * *

UNITED STATES PATENT AND TRADEMARK OFFICE
CERTIFICATE OF CORRECTION

PATENT NO. : 10,630,167 B2  
APPLICATION NO. : 15/889988  
DATED : April 21, 2020  
INVENTOR(S) : Po-Jung Chung et al.

Page 1 of 1

It is certified that error appears in the above-identified patent and that said Letters Patent is hereby corrected as shown below:

In the Claims

Column 20, Claim 15, Line 46-47: "...by the skips control circuit..." should be --...by the SMPS control circuit...--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*